United States Patent [19]

Alig et al.

[11] Patent Number: 5,515,110
[45] Date of Patent: May 7, 1996

[54] COMPUTER GENERATED VIDEO WIPE EFFECTS

[75] Inventors: Robert J. Alig, Boulder Creek; Gerald A. Raitzer, Mountain View; Michael Shinsky, Menlo Park, all of Calif.

[73] Assignee: Adobe Systems, Inc., Mountain View, Calif.

[21] Appl. No.: 412,635

[22] Filed: Mar. 29, 1995

Related U.S. Application Data

[63] Continuation of Ser. No. 938,313, Aug. 28, 1992, Pat. No. 5,412,479, which is a continuation of Ser. No. 595,452, Oct. 1, 1990, abandoned.

[51] Int. Cl.$^6$ .......................... H04N 5/262; H04N 5/272
[52] U.S. Cl. .............................. 348/594; 348/590
[58] Field of Search .................... 348/594, 593, 348/595, 578, 584, 585, 590, 591, 592, 705; H04N 5/262, 5/272, 5/265, 5/275

[56] References Cited

U.S. PATENT DOCUMENTS

| | | | |
|---|---|---|---|
| 3,671,667 | 6/1972 | Thorpe | 348/590 |
| 4,028,727 | 6/1977 | Skydstrup | 348/589 |
| 4,121,253 | 10/1978 | McCoy | 348/594 |
| 4,199,790 | 4/1980 | Greenfield et al. | 348/594 |
| 4,477,830 | 10/1984 | Lindman et al. | 348/589 |
| 4,811,102 | 3/1989 | Chaplin | 348/594 |
| 4,855,834 | 8/1989 | Cawley et al. | 348/594 |
| 5,138,455 | 8/1992 | Okumura et al. | 348/568 |
| 5,412,479 | 5/1995 | Alig et al. | 348/594 |

*Primary Examiner*—Safet Metjahic
*Assistant Examiner*—Michael H. Lee
*Attorney, Agent, or Firm*—Skjerven, Morrill, MacPherson, Franklin & Friel; Norman R. Klivans

[57] ABSTRACT

A computer-based video editing system provides software controlled wipes between scenes. These wipes may be the conventional horizontal, vertical, or clock type wipes used in video to transition from one scene to the next. Instead of being generated by conventional digital wave form generators, the wipes are generated as a bit map in computer memory, thus allowing the editor to design his own wipes as desired. The wipes are generated by comparators which have as their inputs line-by-line video data and computer controlled threshold data so as to control a video switcher to select between scenes as determined by the wipe pattern.

11 Claims, 39 Drawing Sheets

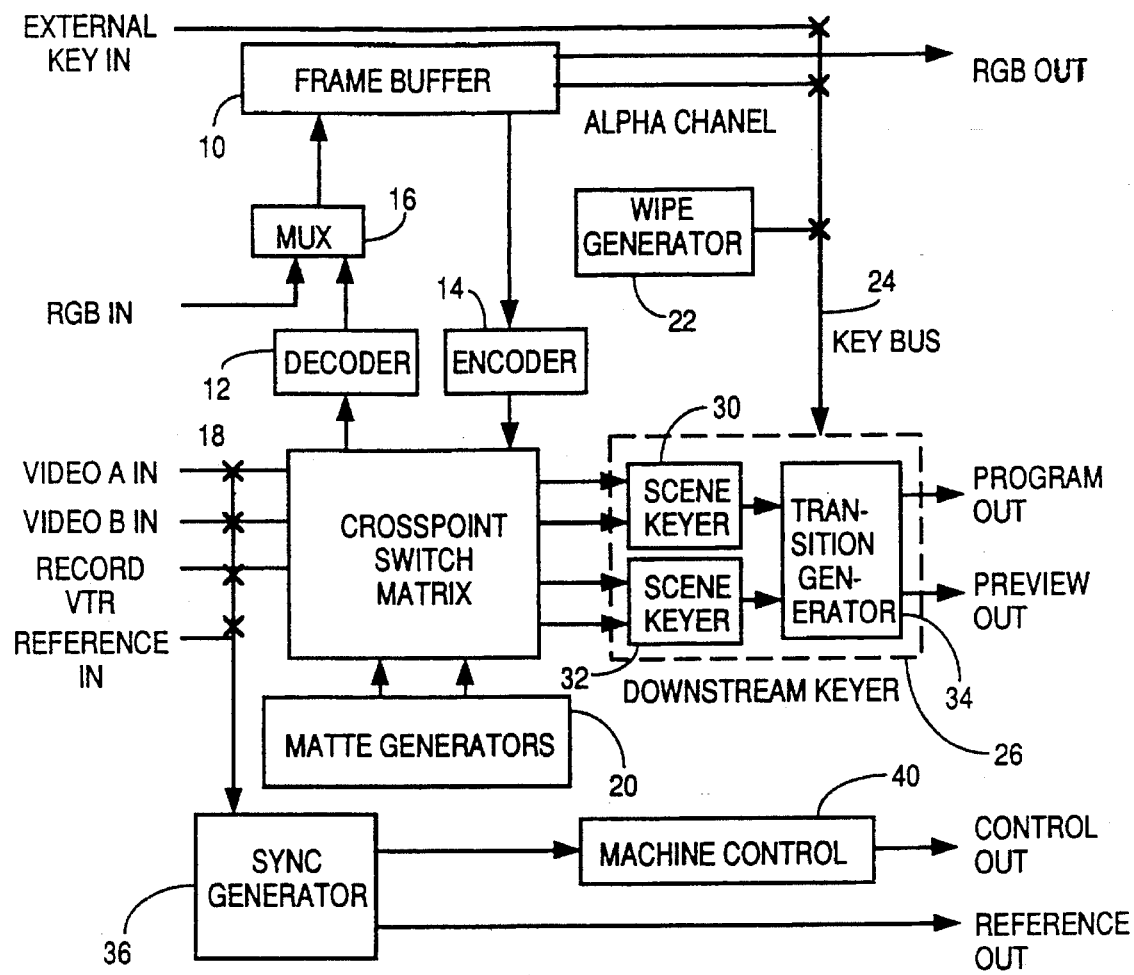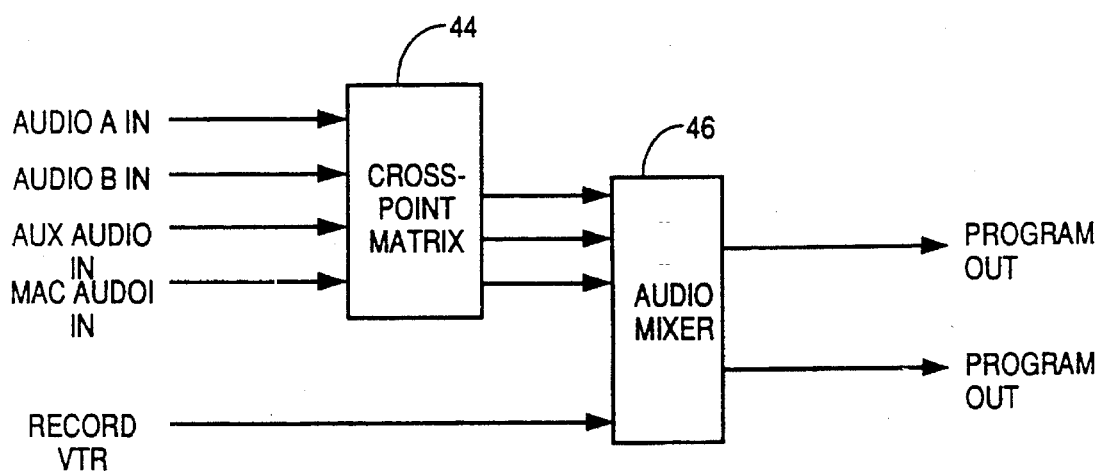
Fig. 1

KEY TO Fig. 4

| Fig. 4A | Fig. 4B | |
| --- | --- | --- |
| Fig. 4C | Fig. 4D | |
| Fig. 4E | Fig. 4F | Fig. 4G |

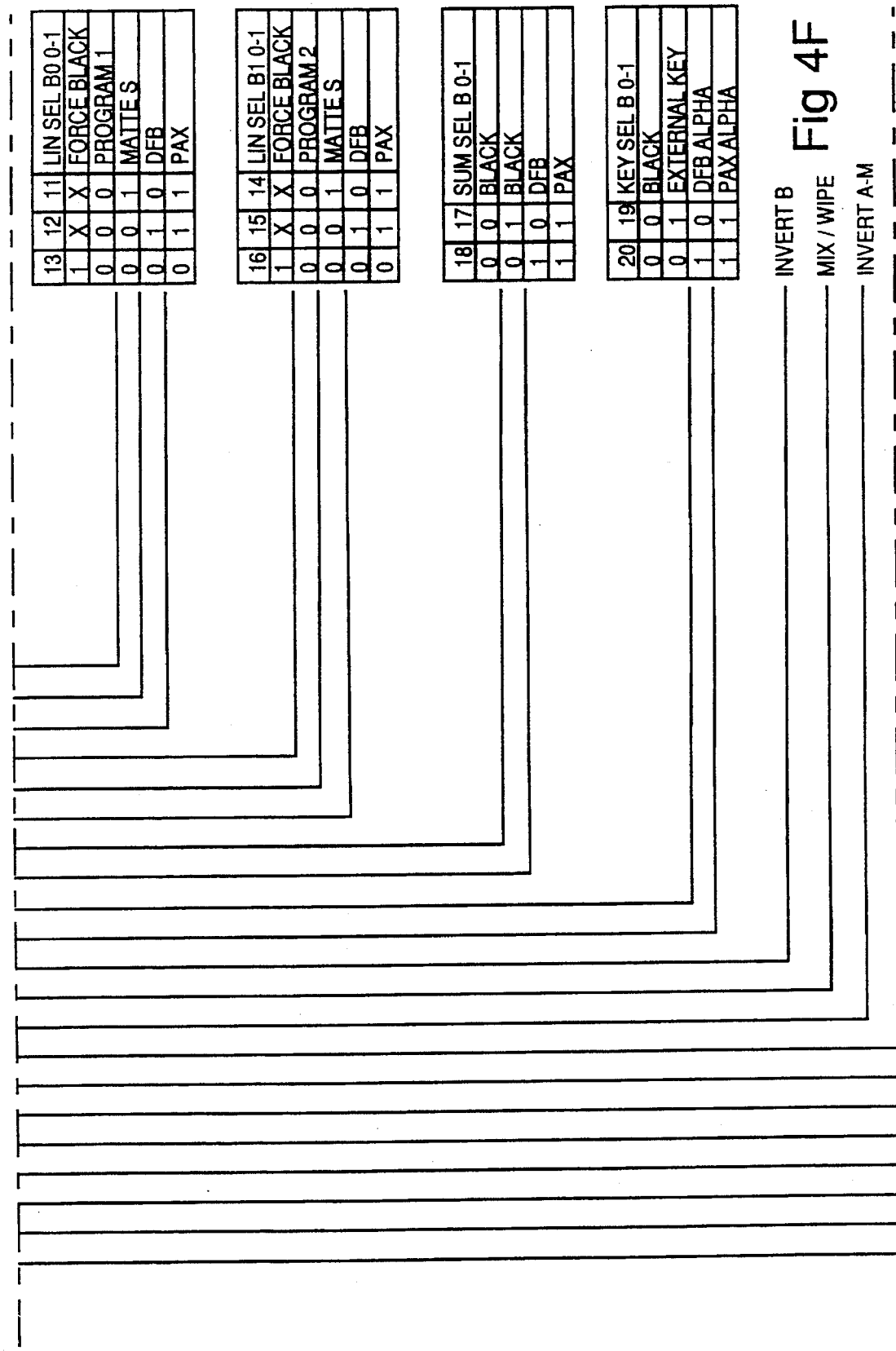

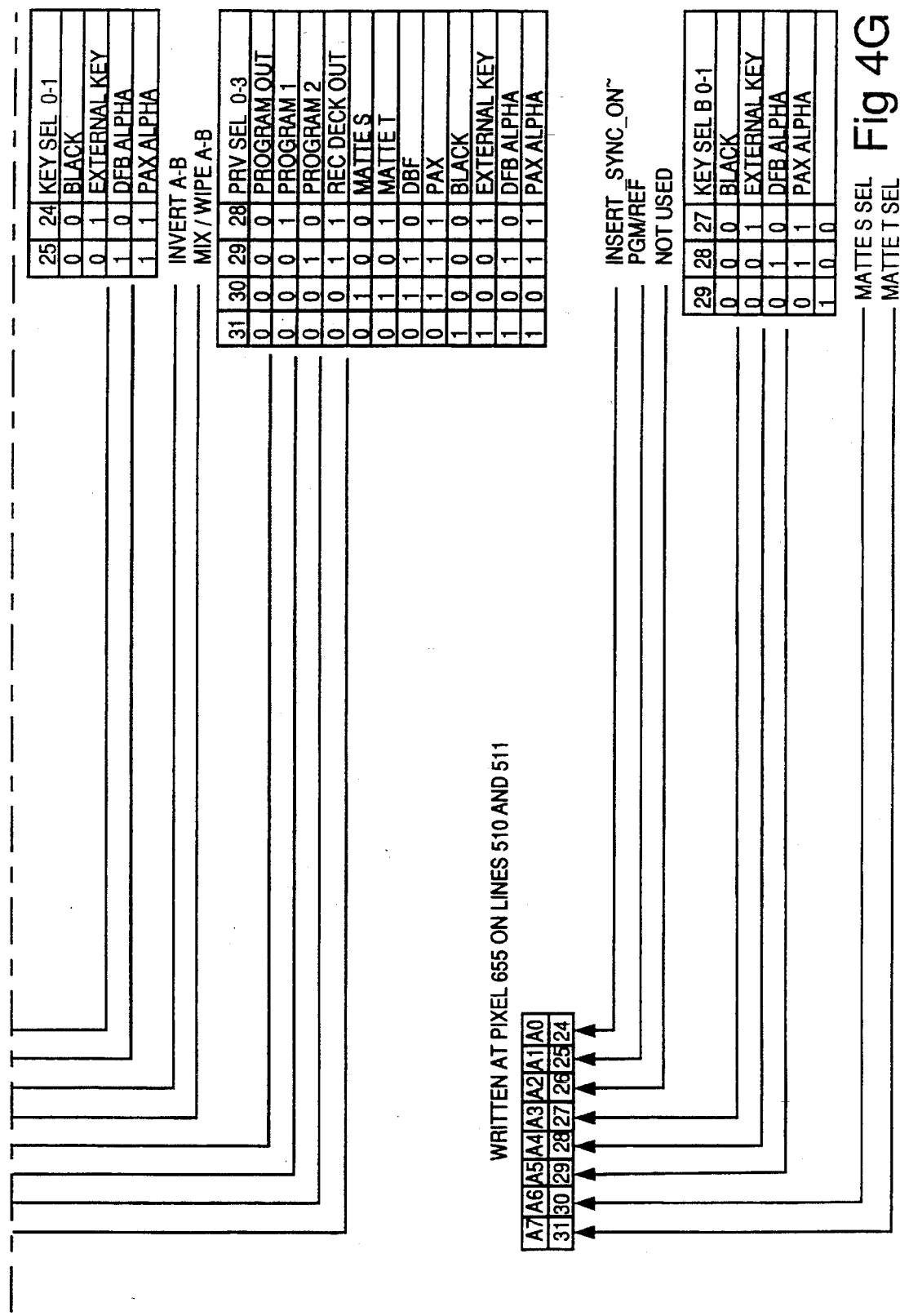

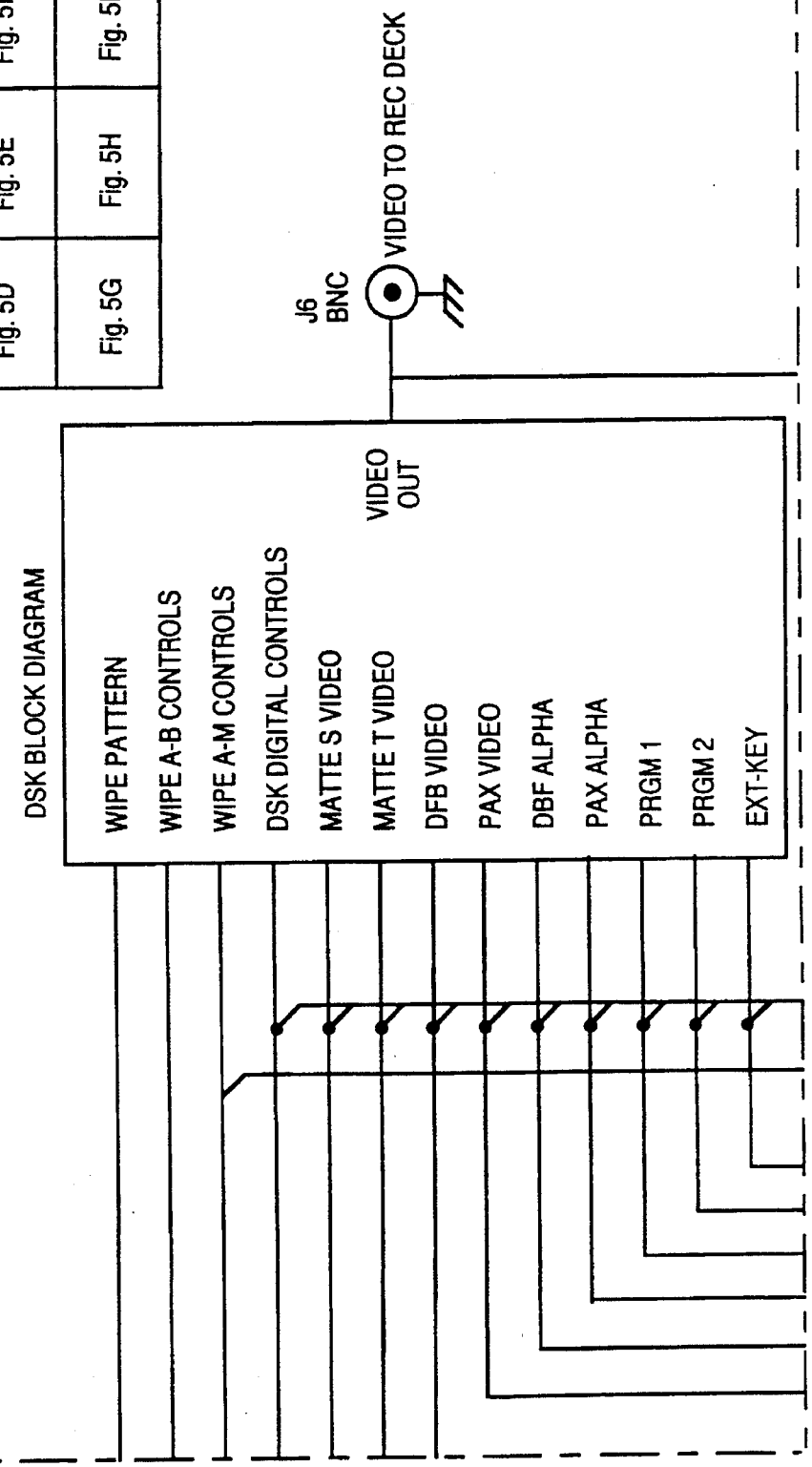

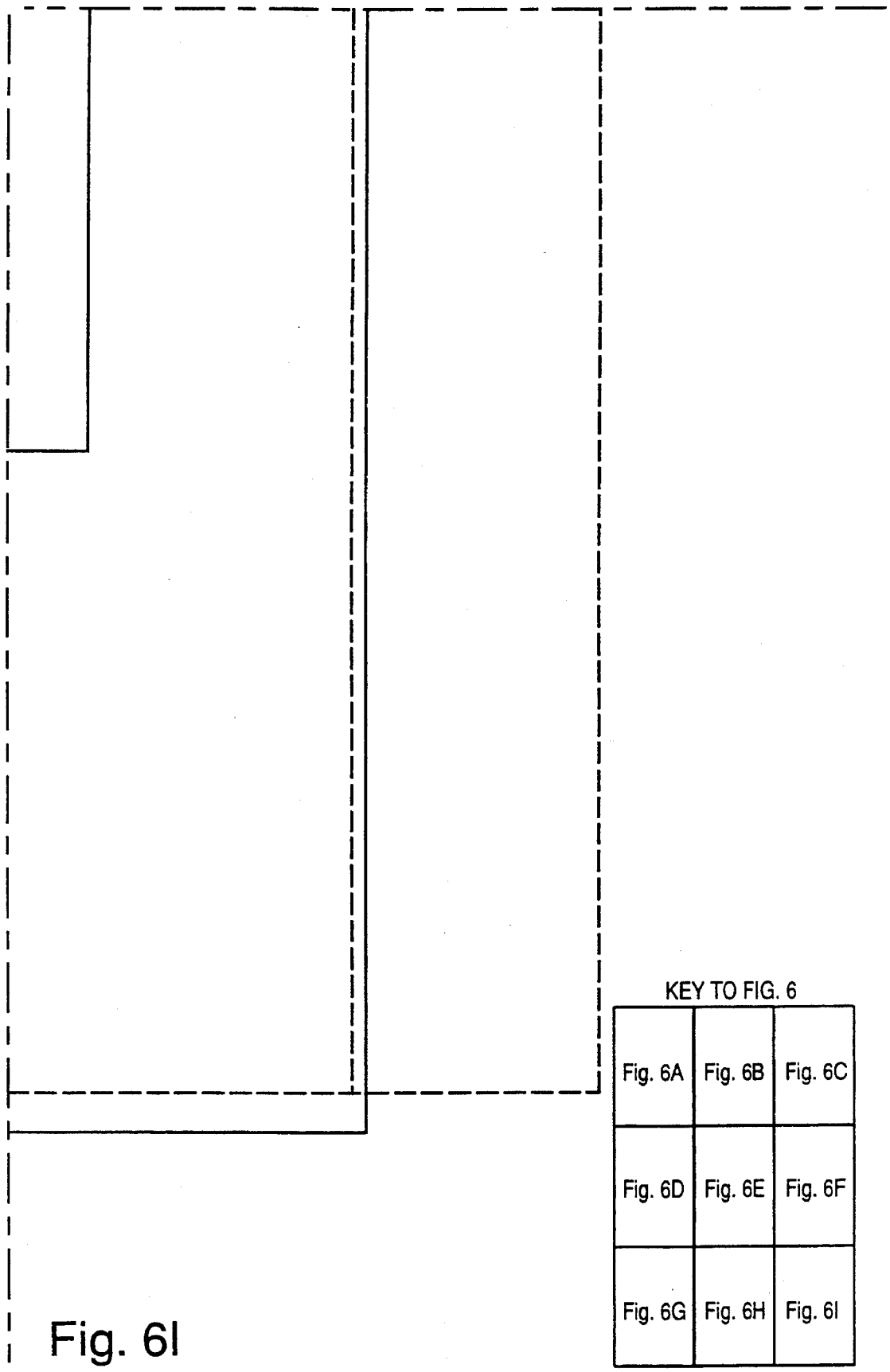

```
define WIPE_HEADER_SIZE           512 typedef struct {
    int      versionNumber;
} WipeHeader_T;

FUNC int    Seq_LoadWipe (Obj_T path)
{
    short               file;
    struct Global_S*    g= NULL;
    int                 i, j, siz, err, y;
    U32_T               buf[80];
    char                hdr[WIPE_HEADER_SIZE];
    char                mode = true32b;

if (err = (int) MSG1(path,pathOPEN,&file)) {
        SCREAM(err,"Seq_LoadWipe: Failed to open wipe file!");
        return err;
    }
    siz = WIPE_HEADER_SIZE;
    if (err = FSRead(file,&siz,hdr) ) {
        SCREAM(err,"Seq_LoadWipe: Failed to read file header!");
        return err;
    }
    If (((WipeHeader_T*)hdr)->versionNumber != 14) {
        SCREAM(-1,"Seq_LoadWipe: Wipe has wrong version number!");
        return -1;
    } for   (i= 0; i<486; i++) {
          siz = sizeof(buf);
          FSRead(file,&siz,(Ptr)buf);
          mode = true32b;
          y = (i > 1) ? i-2 : i + 486;
          SwapMMUMode (&mode);
          for (j= 654; j<=733; j++) {
              WRITE_DFB(DFB_POS(j,y),buf[j-654]);
          } y = (y > 1) ? y-2 : y + 486;
          WRITE_DFB(DFB_POS(734,y),buf[0]);
          SwapMMUMode(&mode);

}
    FSClose(file);
    return SUCCESS;
}
```

FIG. 9

```
/***********************************************
*       local.h.
* Function:
* History:
* 6/1/90         Eric14      Original Version.
***********************************************/ if   !defined(__LOCAL_H__)
      #define __LOCAL_H__ define SUCCESS         0
      #define TRUE            1
      #define FALSE           0 define SCREAM(n,s)         (fprintf(stderr,"###   ERROR %d: %s:
                                  ", n, "test"); \
                                  fprintf(stderr,s);\
                                  fprintf(stderr,"\n");} define C_ define NUM_X_VAL           ((733-654+1)*2)
      #define MAX_X_VAL           (NUM_X_VAL-1)
      #define MAX_Y_VAL           (NUM_Y_VAL-1)
      #define NUM_Y_VAL           (486)
      #define XY_RATIO            (0.25)

#define HEADER_SIZE         512
      #define VERSION_NUMBER      14
      typedef struct {
         int  versionNumber;
      } Header_T;

typedef unsigned short      U16_T;
      typedef unsigned int        U32_T;
      typedef U16_T               Line_T[NUM_X_VAL];

extern long       SZ_;

int       S_FileString (short, num, char* str);
      int       S_FileDelete (Str255 fileName, short vRefNum);
      int       S_FileOpen (Str255 fileName, short vRefNum,
                short* fileNum);
      int       S_FileClose (short fileNum);

#define   S_FILEWRITE(num,st)       (SZ_=sizeof(st),FSWrite
                                          (num,&SZ_,(Ptr)&(Str))
      #define   S_FILEWRITESTR(num,str)   (SZ_=strlen(str),FSWrite
                                          (num,&SZ_,str))
      #define   S_FILEWRITE_BUF(n,b,l)    (SZ_=1,FSWrite(n,&SZ_,
                                          (Ptr)b))
      #define   S_FILEREAD(num,st)        (SZ_=sizeof(st),FSRead
                                          (num, &SZ_,(Ptr)&(st)))
      #endif /* _LOCAL_H_ */
```

Fig. 10(a)

```
/*****************************************
*    test.c
*****************************************/ define_TEST_C_ include <stdlib.h>
include <stdarg.h>
#include <string.h>
#include <stdio.h>
include <math.h> include <files.h>
include <quickDraw.h>
#include <errors.h>
include <Packages.h> include "Local.h"

pragma segment MAIN
/*****************************************
*          ---- defines ----
*****************************************/

/*****************************************
*          ---- Globals ----
*****************************************/

/*****************************************
*          ---- Functions ----
*****************************************/ int  main (void)
{
   Point pnt;
   SFReply stupids;
   short  fileNum;
   Line_T  vals;
   register int  x,y;
   register double  multFact;

InitGraf((char*) &qd.thePort);
   multFact = 0xffc0/sqrt (80*80*16 + 243*243);

pnt.h = pnt.v = 100;
   SFPutFile(pnt,"\pFile's name:","\pUntitled",NULL,&stupidS);
   if (stupidS.good == FALSE)   {
      SCREAM(-1, "save: SFPutFile failed!");
      exit(1);
   }

If (S_FileOpen (stupidS.fName, stupidS.vRefNum,
       &fileNum))  {
      SCREAM(-1, "S_FileOpen failed!");
      exit(1);
   }
   for (y=0; y<=MAX_Y_VAL; y++) {
      for (x=0; x <= MAX_X_VAL; x++) {
         vals[x^1] = (U16_T) (sqrt((x-80)*(x-80)*16 + (y-243)*(y-
           243))* multFact);
      }
      printf(".");
```

Fig. 10(b)

```
        if (y % 48 == 47) {
            printf("\n");
        }
        fflush(stdout);
        S_FILEWRITE_BUF(fileNum,vals,sizeof(vals));
    } if (S_FileClose(fileNum)) {
        SCREAM(-1,"S_FileClose failed!");
        exit(1);

}
}

/*** End of test.c***/
```

Fig. 10(c)

COMPUTER GENERATED VIDEO WIPE EFFECTS

This application is a continuation of application Ser. No. 07/938,313, filed Aug. 28, 1992, now U.S. Pat. No. 5,412, 479, which is itself a continuation of application Ser. No. 07/595,452, filed Oct. 1, 1990 (now abandoned).

BACKGROUND OF THE INVENTION

1. Field of the Invention

This invention relates to a method and apparatus for generating wipes for transitioning between scenes in video. More specifically, the invention relates to user-generated wipes which can be of any configuration as desired by the user for use with a particular video editing system.

2. Description of the Prior Art

Wipes are a video effect well known both in the video art and to the general public. The wipe is a video (or film) special effect that seems to replace one video image with another. In reality, the two video images share the screen but one replaces the other in a set pattern. For instance, a typical wipe seems to push the image off the screen from left to right. Well-known wipe patterns include vertical wipes, horizontal wipes, and special wipes such as the "clock" wipe (also known as the "rotary" wipe) that replaces the images as if clock hands were sweeping the image off the screen.

Wipes are a special form of transition between video images.

In the prior art, wipes are typically formed by digital wave form generators in computer-based video editing. The prior art method requires the presence of these special digital wave form generators and/or analog wave form generators, the output of which is converted to digital form, for forming the particular desired wipe pattern on the screen. This system has the disadvantage that the human editor is limited to the particular wipe patterns which are prespecified by the wave form generators. Thus, it is not possible to have arbitrary range user-definable wipes. Also, the additional complexity of the wave form generators makes the equipment which generates such wipes relatively expensive.

Thus, the prior art has the disadvantage of both limiting the kind of wipes that can be performed, and requiring relatively sophisticated and expensive equipment to perform any sort of wipe.

SUMMARY OF THE INVENTION

In accordance with the invention, user selectable wipes are provided under software control for computer controlled editing of video material. The computer software controls digital hardware in the editing system to generate any sort of wipe as desired by the editor. By storing in a memory that is accessed synchronously to raster a number representing the percentage of one image displayed versus another, it is possible to generate a wide range of wipe effects. In one embodiment, the wipe is generated by a bit map scheme which allows the user to fully control the appearance of the wipes.

The system operates by control of the vertical and horizontal wave forms by a pattern present in the computer memory and by control of the light amplitude for individual pixels of both the initial and the replacing video image. The computer memory is organized with horizontal storage elements and vertical storage elements corresponding to the T.V. horizontal and vertical raster. The digital values stored in each memory location are used as input to comparators with the other input being fed from a computer register. Adjustment of the comparator threshold via the computer registers and comparing that threshold with the pattern in computer memory allows formation of various wipe shapes. Thus, the wipe shapes are completely user definable. The output and its compliment of the comparator drives voltage controlled amplifiers (VCA's) whose transfer function can be modified under computer control smoothly between linear and on/off which selects between several scenes, the scenes being the images shown on the screen which are separated by the wipe boundary. Thus, for instance if it is desired to wipe from scene A to all white on the display, the first VCA input would be scene A and the second VCA input would be all white, and the wipe would transition from scene A to all white according to the pattern selected by the editor.

BRIEF DESCRIPTION OF THE DRAWINGS

FIG. 1 shows a video editing system in accordance with the invention.

FIGS. 8(*a*) and 8(*b*) are data location maps in accordance with the invention.

FIGS. 9 and 10 are computer programs in accordance with the invention.

DETAILED DESCRIPTION OF THE INVENTION

Figure 2:
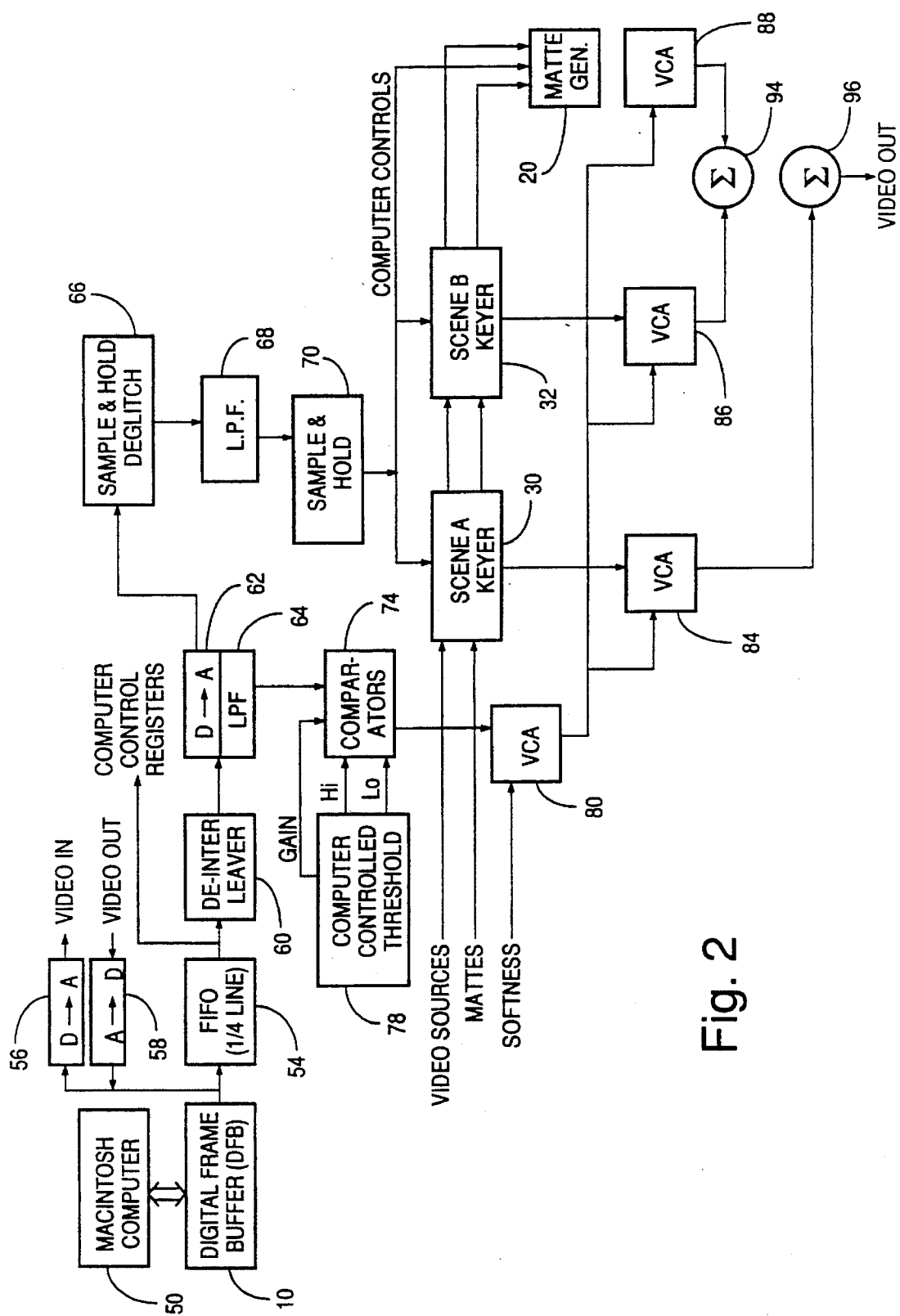
FIG. 2 shows a wipe generator in accordance with the invention.

One embodiment of the present invention is included in a video production system called "Video F/X" commercially available from Digital F/X, Inc., Mountain View, Calif. Further description of other aspects of this system is in copending U.S. patent application Ser. No. 07/590,061, filed on Sep. 28, 1990, entitled "Disk-Assisted Editing For Video Tape", invented by Steven Crane et al, incorporated herein by reference.

FIG. 1 shows a video editing system in accordance with the invention with conventional video signal inputs (left side) and outputs (right side) as shown. Also included are conventional digital frame buffer 10, decoder 12, encoder 14, multiplexer 16, crosspoint switch matrix 18, and matte (colored field generators) generators 20.

Wipe generator 22 (described in more detail below) provides via key bus 24 wipe inputs to downstream keyer 26 which includes scene A keyer 30, scene B keyer 32, and transition generator 34. Also shown is conventional vertical sync generator 36 and machine control 40 for control of connected VTR's (video tape recorders) which are not shown. The lower part of FIG. 1 shows the conventional audio portions of the system including audio inputs, cross point switch matrix 44, and audio mixer 46.

The Wipe Generator 22 shown in detail in FIG. 2 and described below is substantially different than conventional wipe implementations which use ramp and parabola function generators. In the conventional approach the ramp, triangle, and parabola functions are generated horizontally and vertically and summed together.

As shown in FIG. 2, the portions of a video editing system which provides software controlled wipes include a Macintosh II computer 50 for control purposes. Digital frame buffer 10, as described in the above-mentioned copending application, is provided as a part of a circuit board installed in computer 50. This is a 32-bit digital frame buffer with approximately 1.5 megabytes of memory. A portion of the frame buffer 10 memory that does not store that portion of the video image being displayed is used for the software controlled wipe generation. Thus, a wipe pattern is drawn into the reserved portion of the frame buffer 10.

At each horizontal retrace, i.e., each video horizontal line, the horizontal line information in digital form is transferred from frame buffer 10 into a FIFO 54. The size of FIFO 54 is one-quarter line. A ¼-horizontal size of the wipe pattern is stored in memory to save data space and transmission time. FIFO 54 expands the compressed picture to fill the entire screen by reading out data at a clock rate slower than the write clock. Video is provided to/from frame buffer 10 by converters 58, 56. The data in FIFO 54 is transmitted to a Data De-Interleaver 60 to convert the 32 bits from the frame buffer 10 to two 16 bit samples. From the Data De-Interleaver 60 the 10 bits of wipe data go to a 10 bit DAC (Digital to Analog Converter) 62. The output of DAC 62 goes to the sample and hold Deglitching circuit 66, which is a conventional track and hold used to blank the output of the DAC 62 for 82 nsec after DAC 62 receives new data. The Wipe Function signal is then passed through a 5 pole 1.5 MHz Chebyshev low pass filter (LPF) 68 to further smooth the waveform.

Along with the wipe function, all of the analog computer controlled voltages are also derived from the 10 bit DAC 62. A second level of sample and holds 70 are required to time share the DAC 62 and LPF 64 between multiple functions. The low pass filter (LPF) 64 smoothes out the resulting decompressed waveform to compensate for only ¼ of the nominal 640H samples normally associated with horizontal scanning.

The output of the low pass filter 64 is provided to two comparators 74. Comparators 74 are also provided with a high threshold and a low threshold input signal. (Implied is a third state not higher than high or lower than low.) The high and low threshold signals are provided from a computer-controlled threshold generator 78 which in turn is software controlled to generate a particular wipe pattern. The high/low comparators 74 allow for setting inner, middle and outer thresholds for bordered wipes.

Figure 3A:
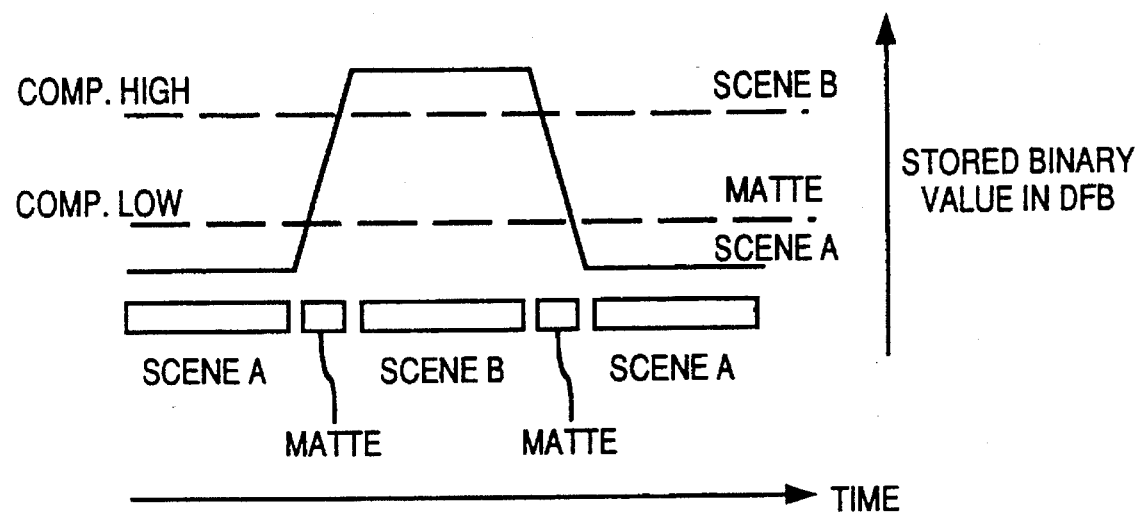
FIGS. 3(*a*) and (*b*) show wipe generation in accordance with the invention.
Figure 3B:
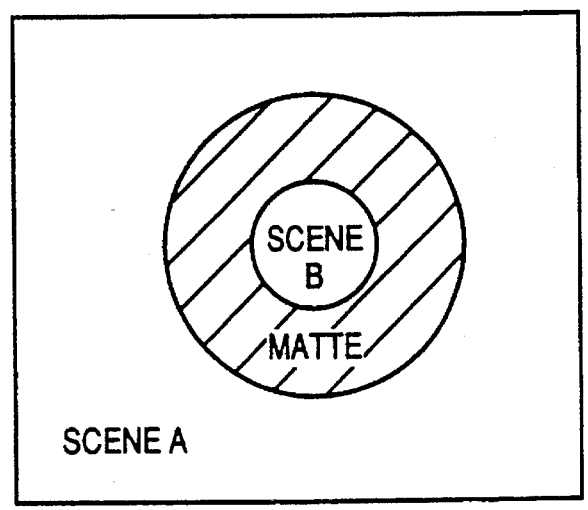

FIG. 3(a) shows a wipe graphically in term of amplitude (vertical axis) vs. time (horizontal axis) with a transition from scene A to scene B with an interposed matte. FIG. 3(b) shows the same wipe at one instant in time, as it would appear on the screen. The use of the comparators 74 (see FIG. 2), with two thresholds, allows wipes which separate more than one scene, i.e., two scenes thus allowing more complex wipe patterns. Alternately additional levels of comparison, beyond high, between high and low, and low will allow more scenes than two with a border.

The computer controlled threshold generator 78 also controls the gain to the comparator 74 using a conventional voltage controlled amplifier 80 thus allowing the softness, i.e., fuzziness of the transition from one scene to the next to be controlled so that either a harder transition or a softer transition appearance between the two scenes may be maintained at the wipe boundary. Higher gain corresponds to a faster transition of the comparator. This corresponds to a sharper switch between scenes.

The output of the comparators 74 controls additional VCA's 84, 86, 88 whose input is video signals (scenes A and B) and mattes. (Scenes are video signals that have multiple video signals mixed together as conventional in the video industry.)

In one embodiment, the wipe data in computer memory is in 32 bit wide format organized to scan memory synchronous to horizontal and vertical raster scan. Each 32 bits includes two horizontal samples of 10 bits or more for transmission to the FIFO 54; an alternative embodiment stores the data as run length encoded data in memory. Multiple video and matte sources are both provided to a scene keyer/switchers 30, 32. The keyers 30, 32 accept digital, on/off, and select control commands from the computer and priority and sense select information from the computer every 1/60th second and combine the analog switching signals from the computer via the sample and hold 66, 70 and mixing or keying information which is optionally contained as part of the video signal to control the voltage controlled amplifiers 84, 86, 88. Keying in the keyers 30, 32 is conventional, implementing the Porter compositing algorithms via conventional VCA's 84, 86. The transition generator 34 of FIG. 1 includes VCA's 84, 86, 88 and summers 94, 96 and has as its input for example video scene A, video scene B, . . . , video scene i. The transition generator 34 then selects between the scenes A, B, . . . , i so as to provide the desired "video out". The transition generator receives control for its several VCA's 84, 86, 88 from the high/low comparators 74. The outputs of the several VCA's 84, 86, 88 are summed together by summers 94, 96 to provide the final video (or program) out.

A circuit board (designated in one version VID1S) is one of two analog circuit boards (the other being designated VID1M) in the system. The video system consists of one digital and these two analog boards. The digital board is a conventional memory mapped video display card, with the added ability to DMA video data to and from the two analog cards. (The memory map is shown in FIG. 4 and described below.) The control data which is direct memory addressed (DMA) includes data contained in the video retrace times as well as video data during the active horizontal and verticall scan times. VID1M and VID1S are located in a separate chassis horizontal and vertical connected via a parallel digital cable. The VID1S board and the board VID1M communicate electrically via conventional 40 pin and a 60 pin flat cables. The VID1S board works in either a NTSC mode or in a Y/C mode. (NTSC is a composite video signal where the luminance and chroma signals are spectrum interleaved. In Y/C the luminance and chroma signals are separate. Additional connectors and switcher elements are required for handling the two separate signals.) Switching is provided in the Y/C configuration to allow NTSC operation through the Y channel.

The following functions (see FIG. 1) are performed by the VID1S board:

1) Video source switching for the DFB 10 (Digital Frame Buffer).

2) Sync source switching for the SYNC Generator 36.

3) Video source switching for the DSK 26 (Down Stream Keyer).

The VID1M board provides the following functions:

1) Wipe generation (Wipe generator 22)

2) Matte Generation. These are matte generators 20 of colors used for backgrounds or for fill colors in bordered wipes.

3) Gain and offset controls for the ALPHA KEY and an EXTERNAL KEY.

4) Gain controls for the two PROGRAM INPUTS. (Video A in, Video B in)

5) Multiple level DSK 26 (Down Stream Keyer).

6) Preview Bus allows monitoring of any of the many video sources.

7) NTSC Encoder for the output of the DFB.

8) NTSC Encoder for an external RGB source (RGB in).

FIG. 4 shows diagrammatically the Frame Buffer and related timing diagrams. (FIG. 4 includes subfigures arranged as shown in the key on FIG. 4A.) As seen in FIG. 4A showing dimensions of Digital Frame Buffer 10, the area from pixel 654 thru 733 on lines 0 to 485 is the Wipe Function area. This is a time compressed (subsampled) image of the wipe. This image is shifted out of the DFB during horizontal blanking, into FIFO 54 (see FIG. 2). The image is decompressed by reading the FIFO 54 with a clock 8 times slower than the write clock. The 80 pixels stored in the Wipe Function area of the DFB 10 are expanded to the same size as the active video. If there were only 80 pixels for the wipe function horizontally, this would yield a coarse wipe. Since the wipe data is 10 bits wide and the DFB 10 is 32 bits wide, by interleaving the data in the DFB 10 (as shown in Table 1 below) the bandwidth of the wipe generator is doubled by de-interleaving the compacted 32 bits from the frame buffer 10 into twice the number of 16 bit values at the output of the FIFO 54.

analog values for gains, colors, etc. via a 10-bit DAC 62 on the V1D1S board. DAC 62 is time-multiplexed to provide all of the analog control voltages, plus the Matte Generator 20 RGB values.

The advantage is that control information is transmitted to the external analog video circuitry over the existing digital video bus, and that the computer can interact with any of these control "registers" in real time by accessing locations in memory which are associated with the opposite video field from the one being displayed. This "background" type of access requires the computer to observe the Vertical Sync interrupt and the Video Field Flag from the DFB 10. Since all of the control information is in the DFB 10 memory, any of the control values may be read back by the CPU at any time.

Figure 4A:
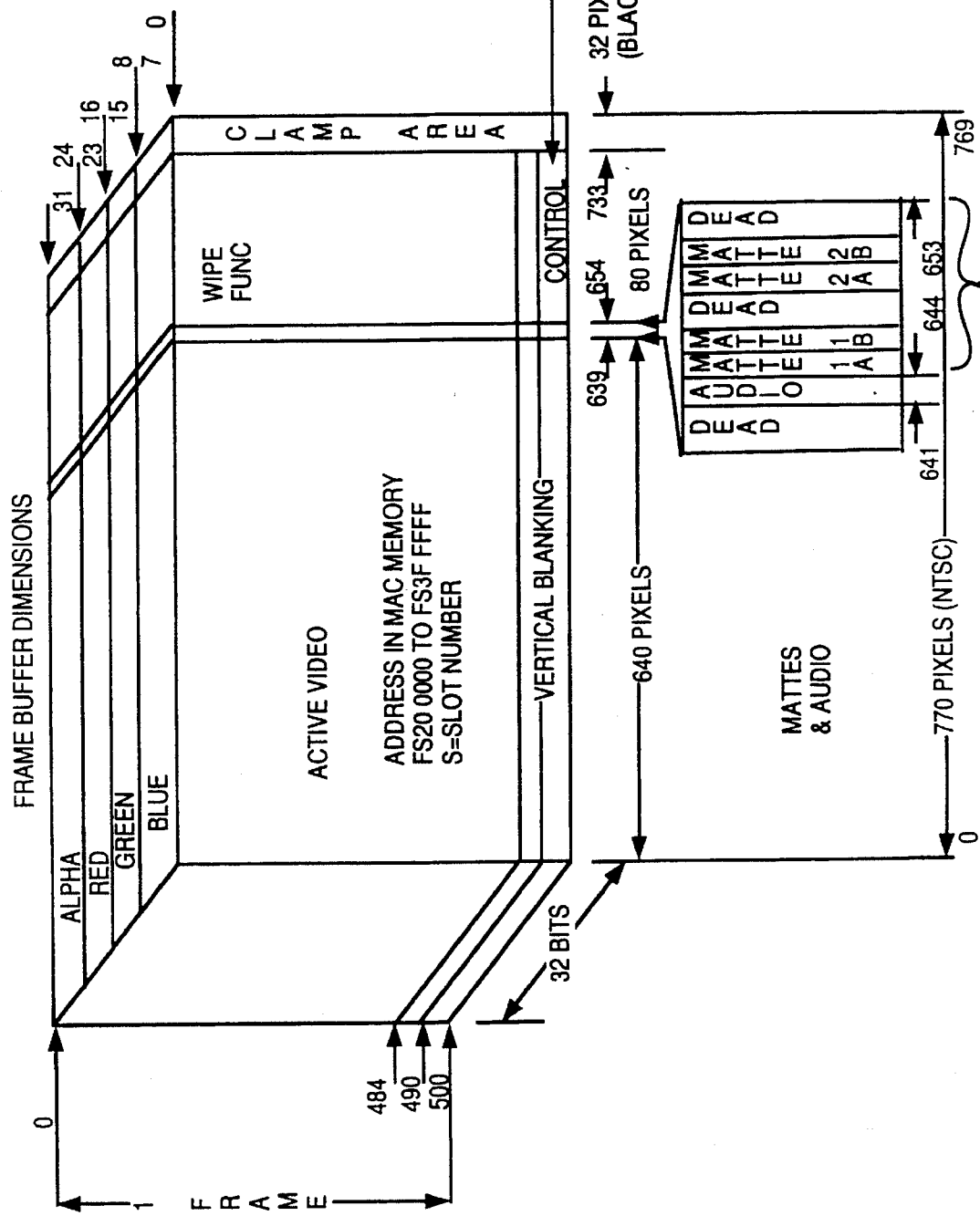
FIG. 4 shows video memory in accordance with the invention.

Wipe patterns are generated as two-dimensional shapes in a 160-word by 484-line space shown in FIG. 4A in the DFB 10 memory. The Wipe values are stored as two 10-bit words (see FIG. 4B) packed into the upper and lower words of the DFB memory at each address in the Wipe space. As each video line is read out of the frame buffer, the 160-word wipe information for the next line is stored in the FIFO 54. The wipe information is then read out of the FIFO 54 at a rate of one-fourth that of the video pixels and sent to a 10-bit DAC 62 which generates the wipe pattern voltages. Due to the shift in data rate, the 160-word wipe pattern for each line is evenly distributed over the 640-pixel video display line. The

TABLE 1

| 31      24 | 23      16 | 15      8 | 7      0 |
|---|---|---|---|
| ALPHA | RED | GREEN | BLUE |
| 7 6 5 4 3 2 1 0 | 7 6 5 4 3 2 1 0 | 7 6 5 4 3 2 1 0 | 7 6 5 4 3 2 1 0 |
| WIPE ODD | X X X X X | WIPE EVEN | X X X X X X |
| 9 8 7 6 5 4 3 2 1 0 | X X X X X | 9 8 7 6 5 4 3 2 1 0 | X X X X X X |

FIG. 5 (including subfigures arranged as shown in the key in FIG. 5A) shows in more detail board VID1M where (see FIG. 2) data from the DFB 10 is sent via VID1S to the VID1M data in, is time expanded via the FIFO 54, sent to the control registers and de-interleaver 60, and converted to the various analog control via the DAC 62 and sample and holds 66, 70.

FIG. 6 (including subfigures arranged as shown in the key in FIG. 6A) shows the summers 94, 96 and VCA's 84, 86, 88 in more detail where two VCA's are connected to perform the function out=α.In1+(1−α) In2

Where α is the control function in FIG. 6, then that block is labeled "mixer" in FIG. 6.

FIG. 7 shows in detail DAC 62 and sample and holds 66, 70. (FIG. 7 includes subfigures arranged as shown in the key in FIG. 7A.)

The computer interface is not directly implemented through a bus; the controls (see FIG. 1) for Wipes, Mattes, Chroma Key, Downstream Keyer (DSK), Video Switcher, and the Audio Mixer are stored in the Digital Frame Buffer (DFB) 10 utilizing extra space in the memory which is not used for active display video (in the horizontal and vertical blanking intervals). The computer 50 writes into DFB 10; the memory is DMA'd to computer control registers. The DFB 10 functions as a very large register file, with the "register" contents being sent out over the video bus at a 60 Hz update rate. Most of the register values are used to set higher the compression rate the lower the accuracy of the wipes.

Figure 4B:
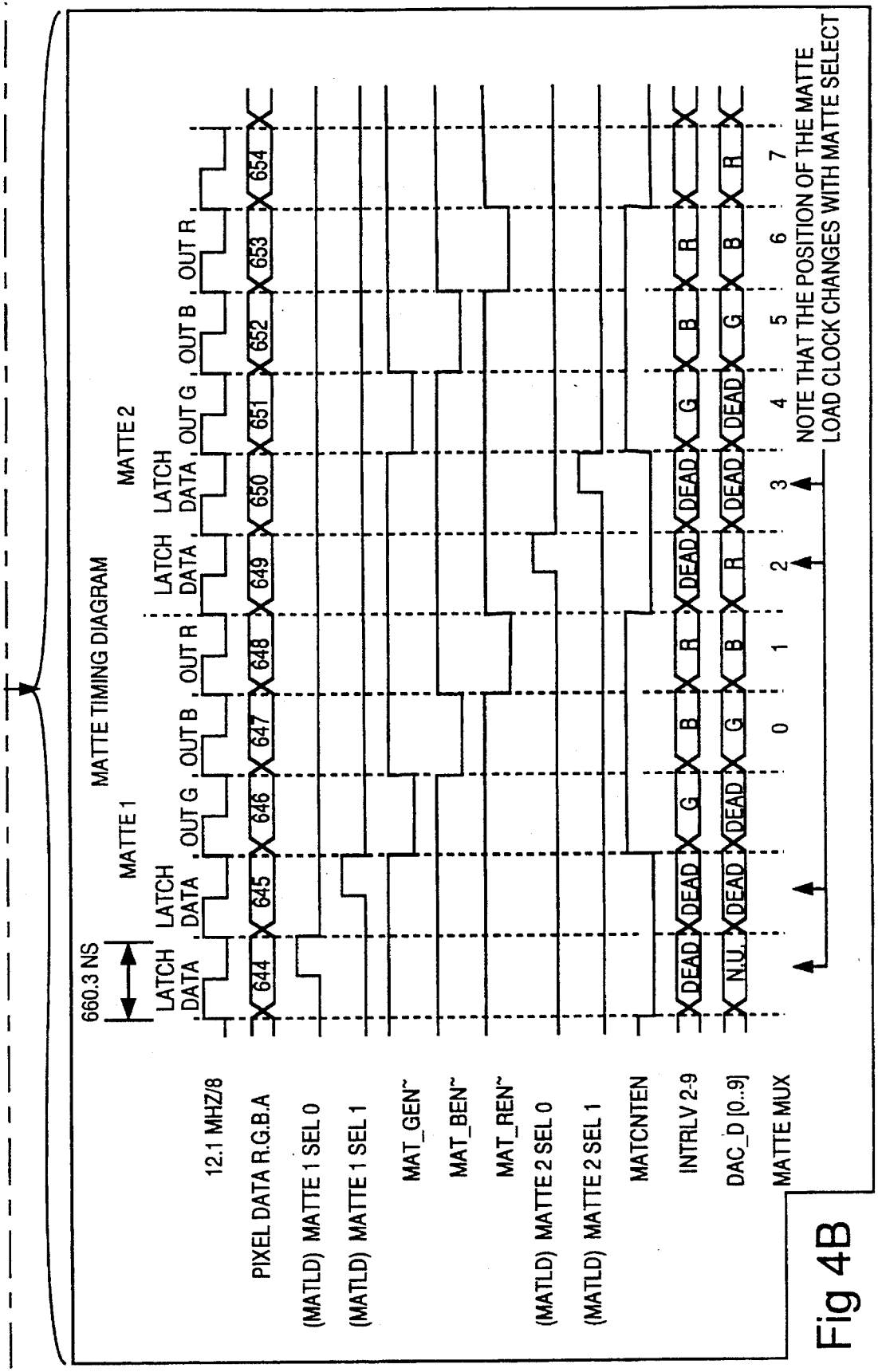
Figure 4C:
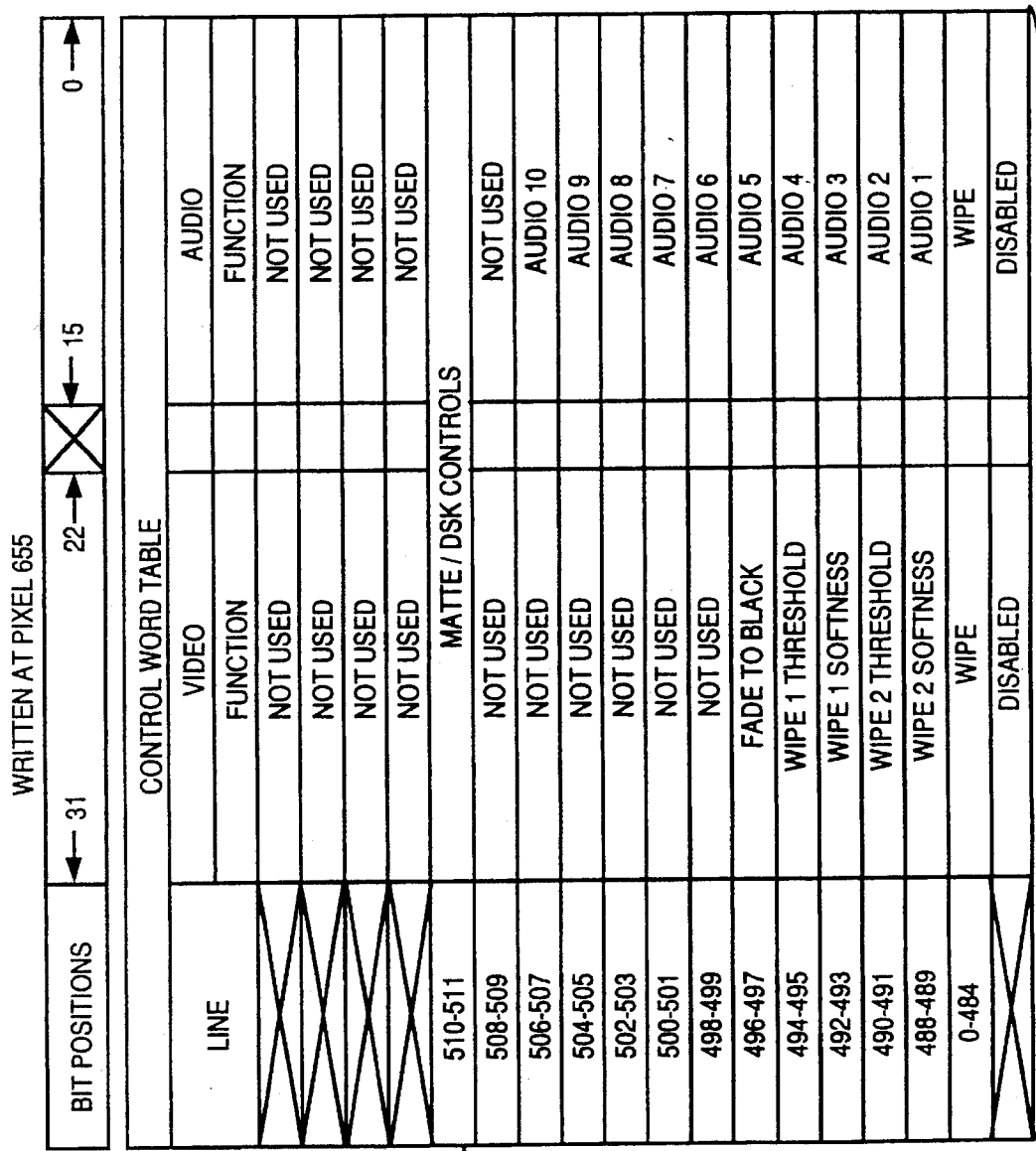
Figure 4D:
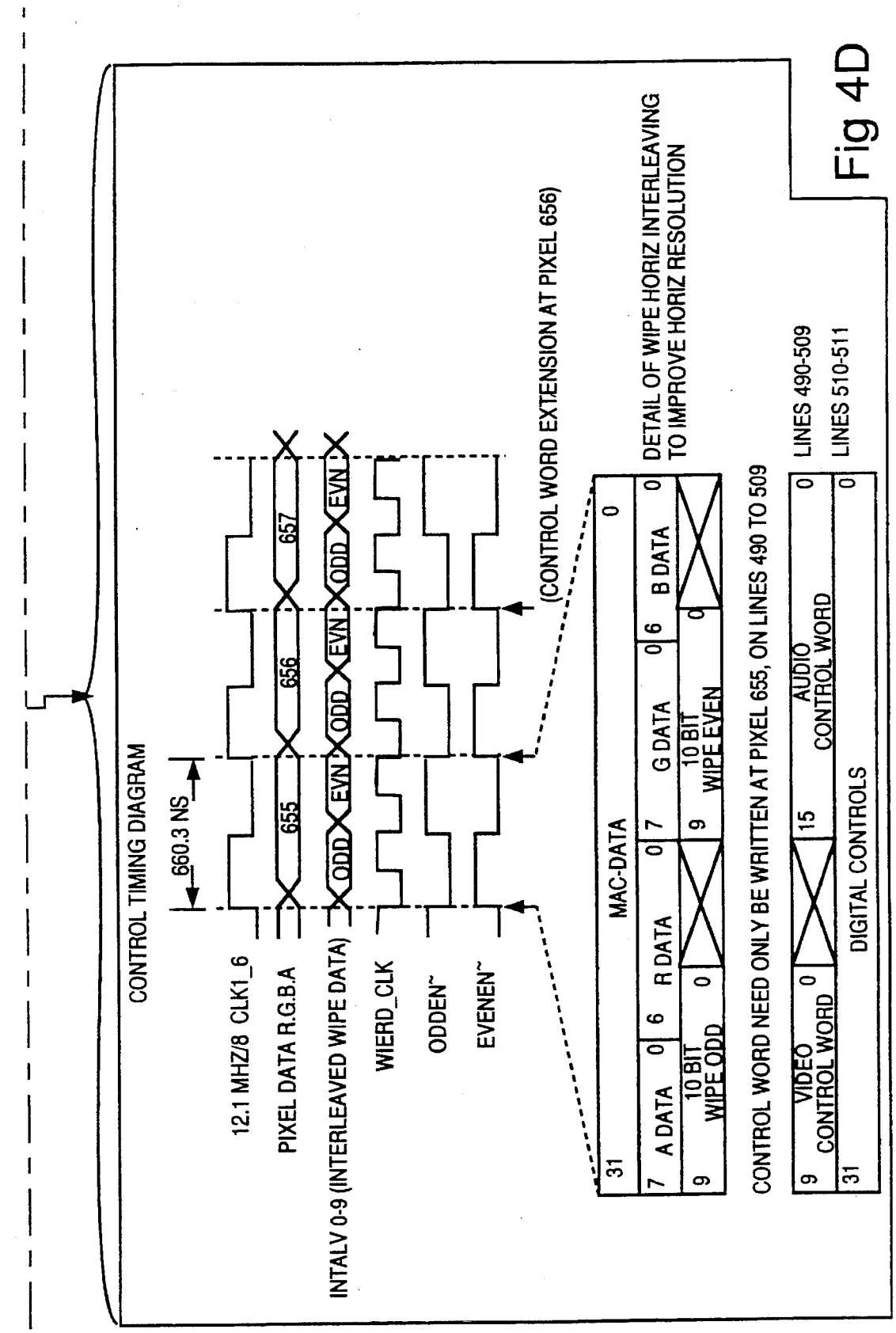
Figure 4E:
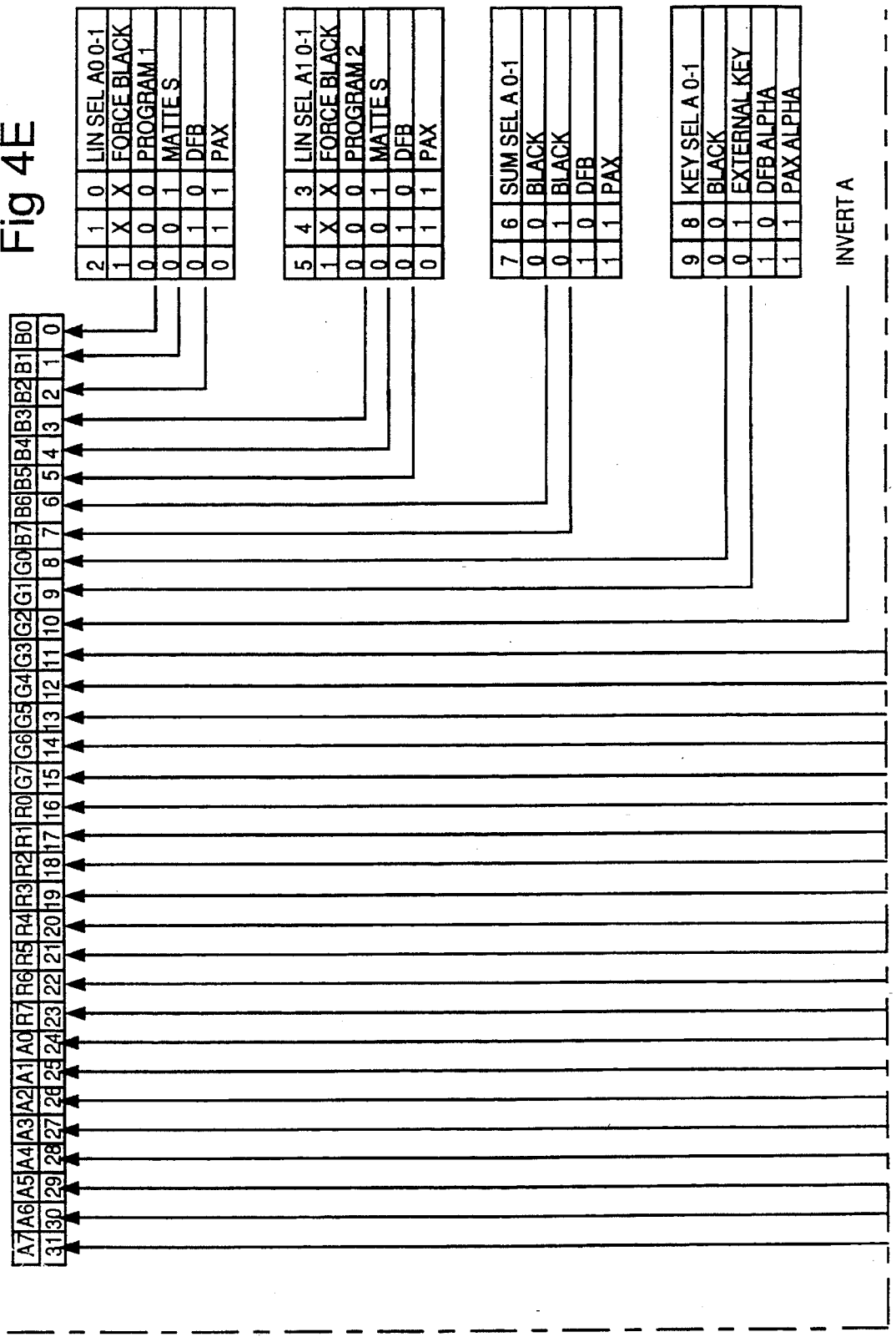
Figure 5A:
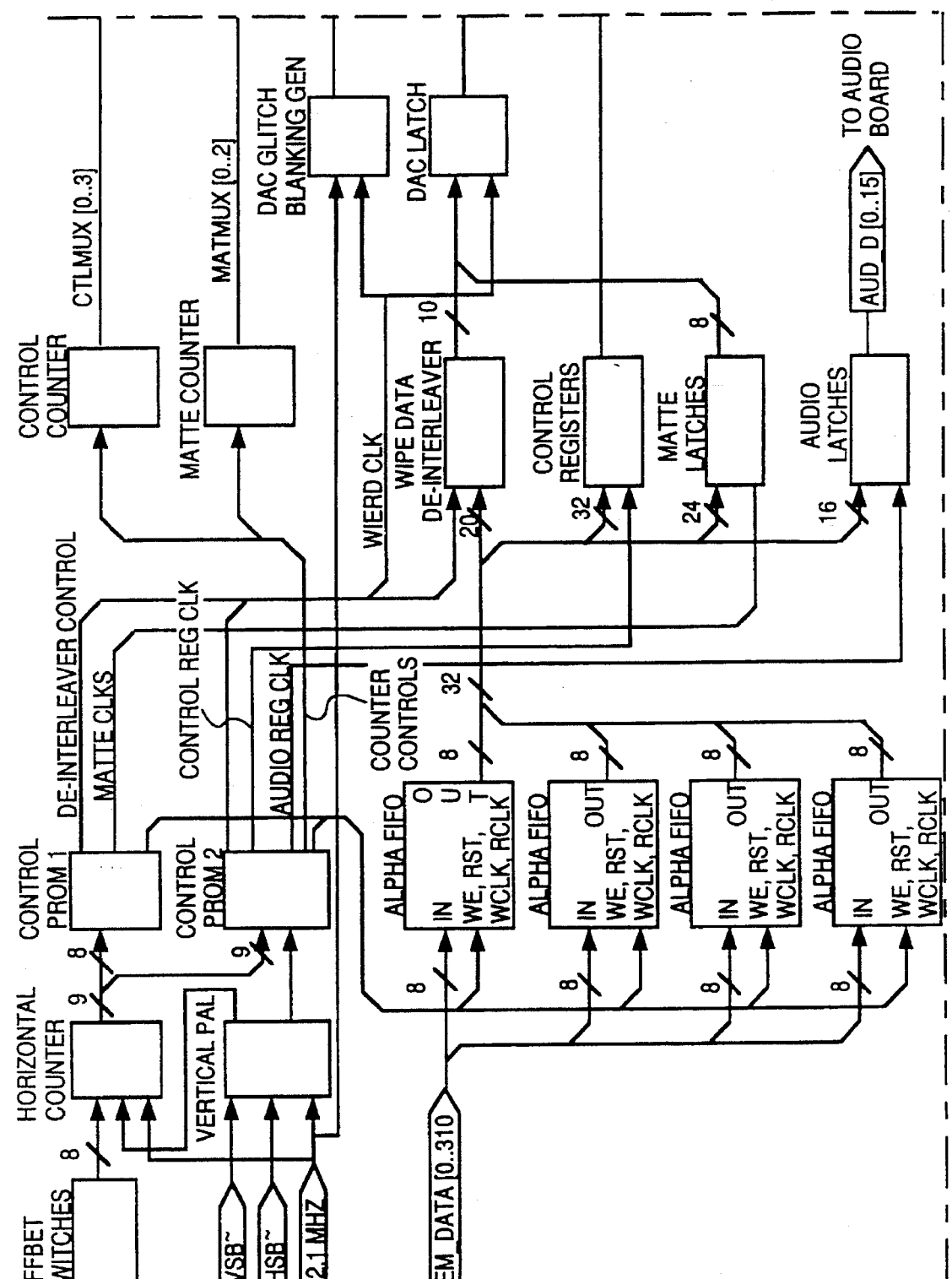
FIGS. 5 to 7 show circuitry in accordance with the invention.
Figure 5B:
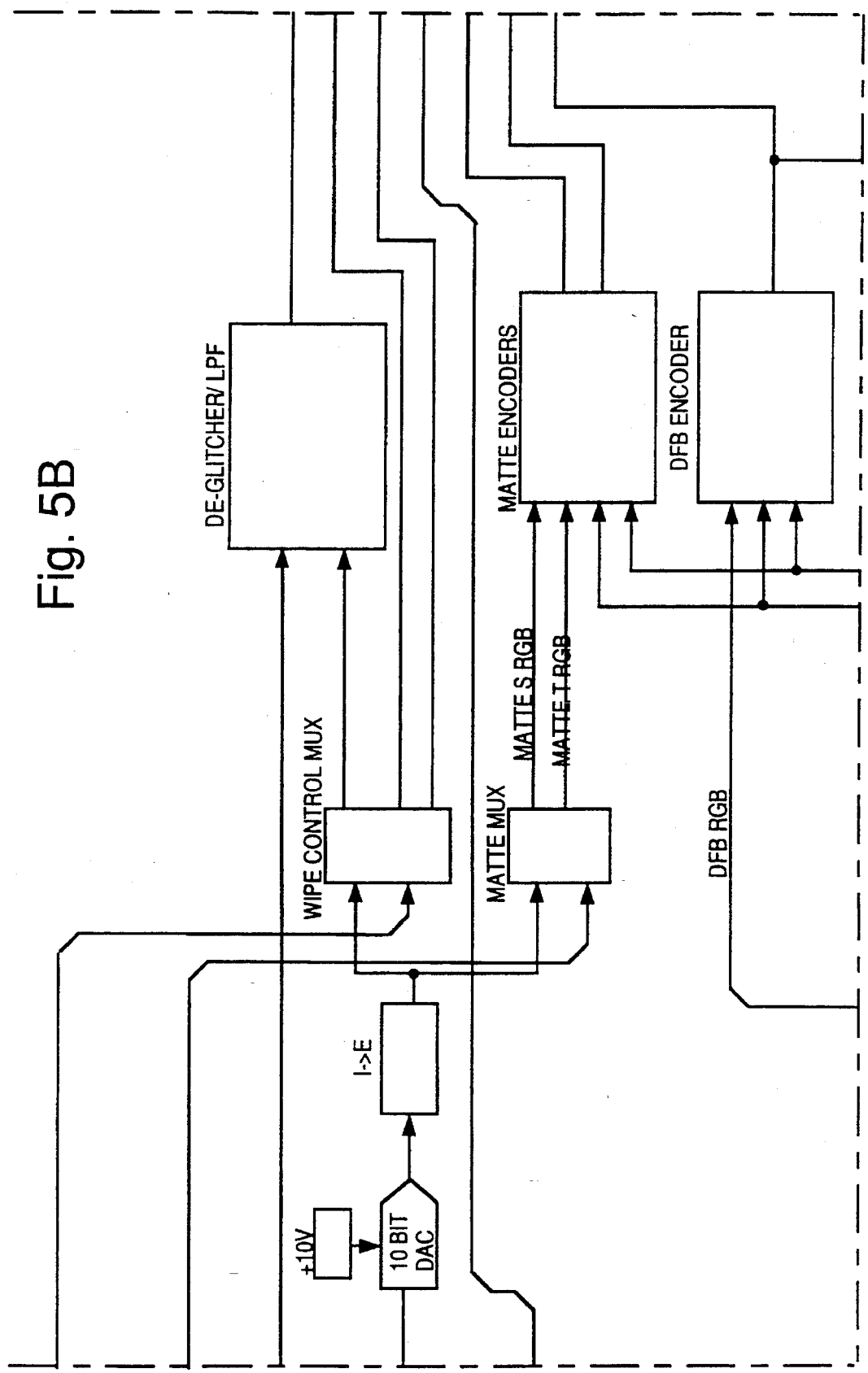
Figure 5D:
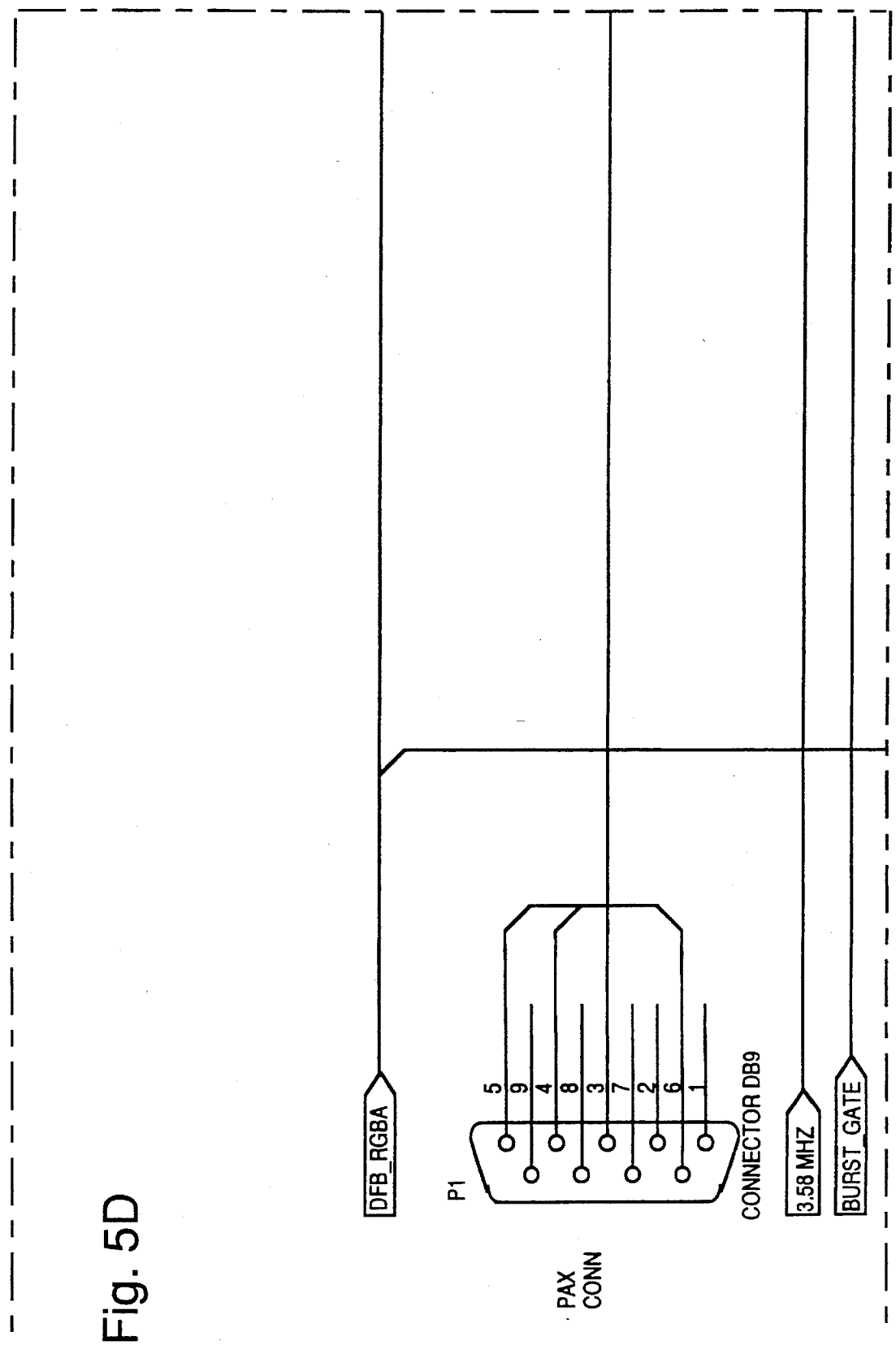
Figure 5E:
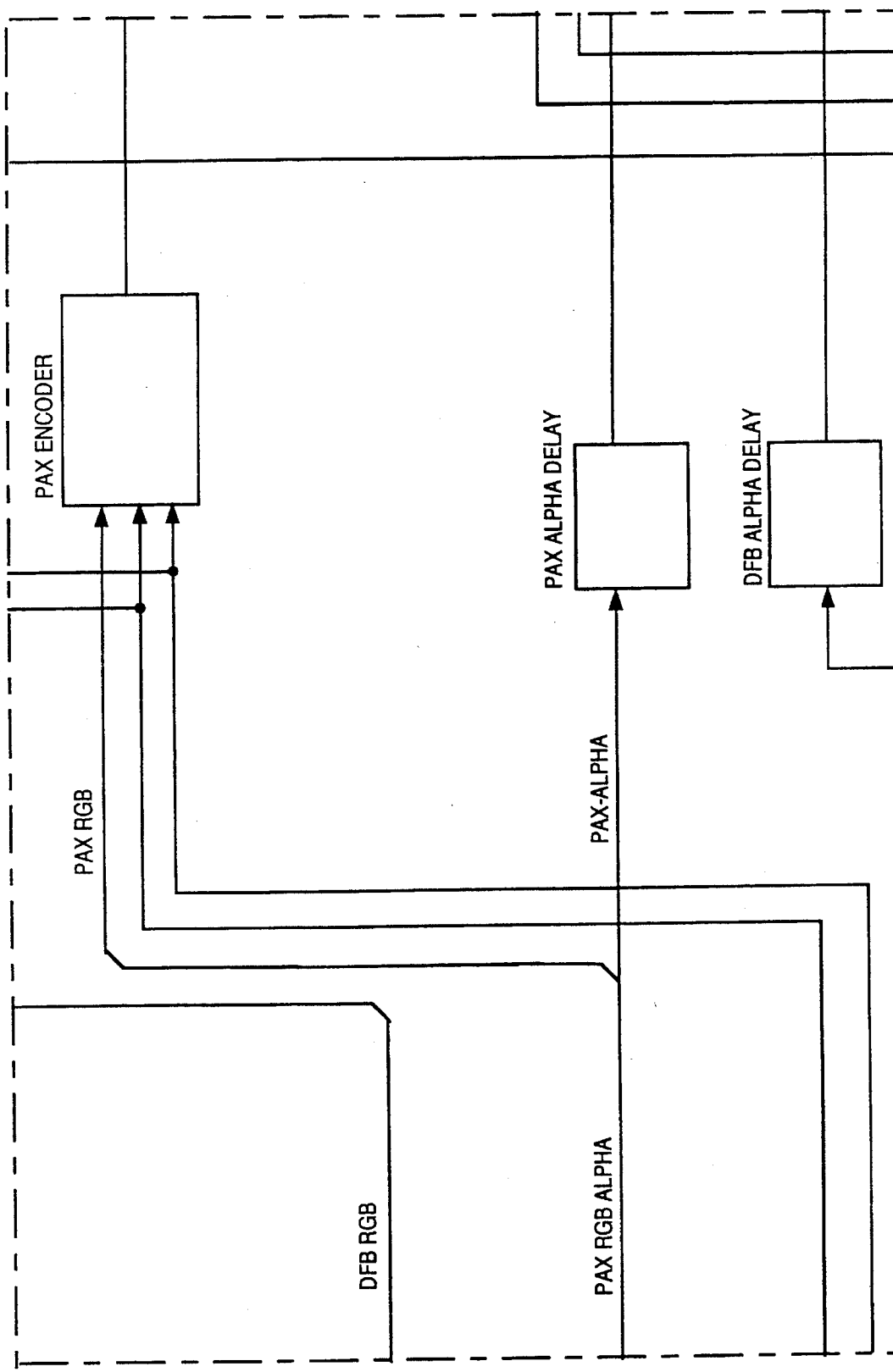
Figure 5F:
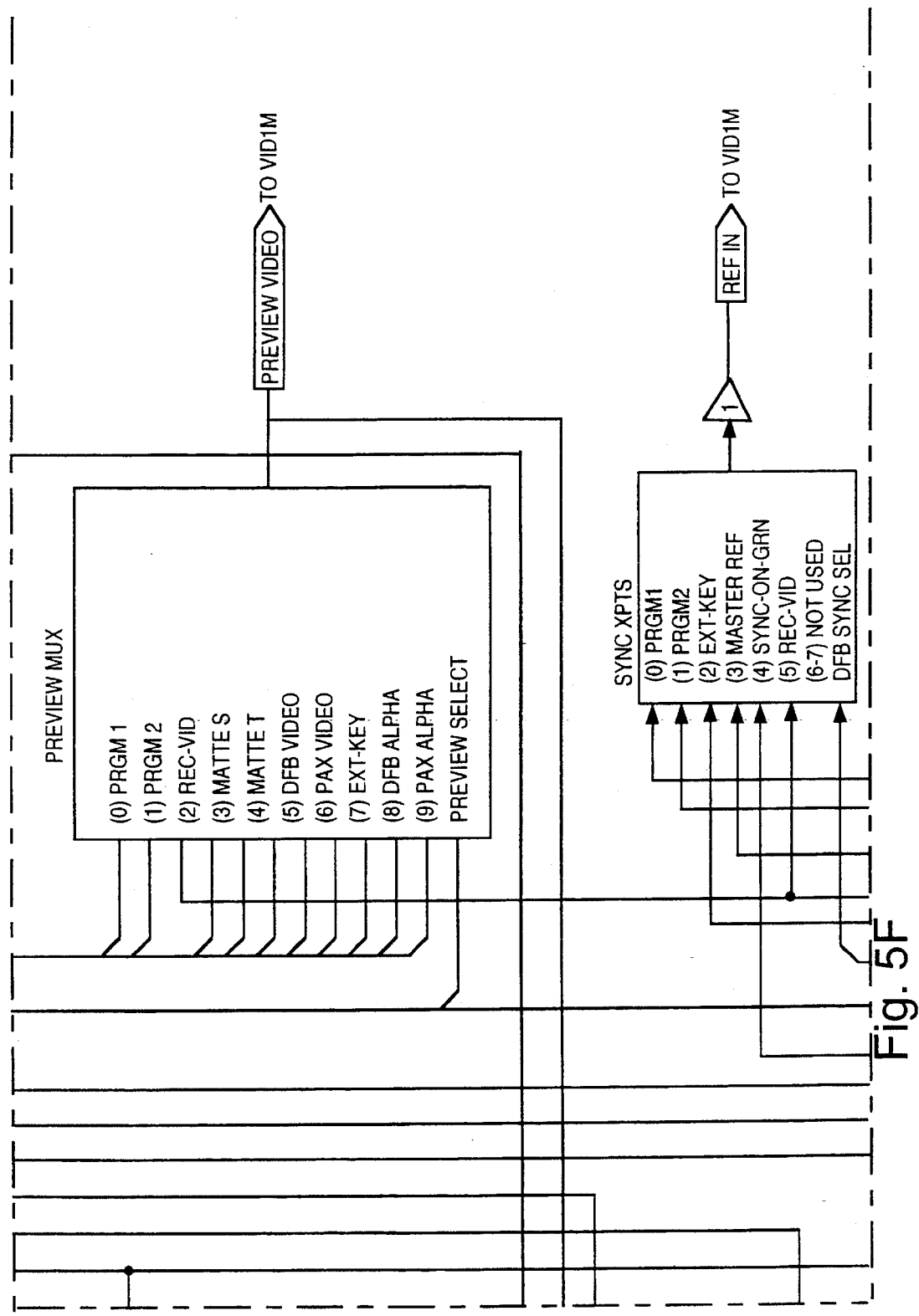
Figure 5G:
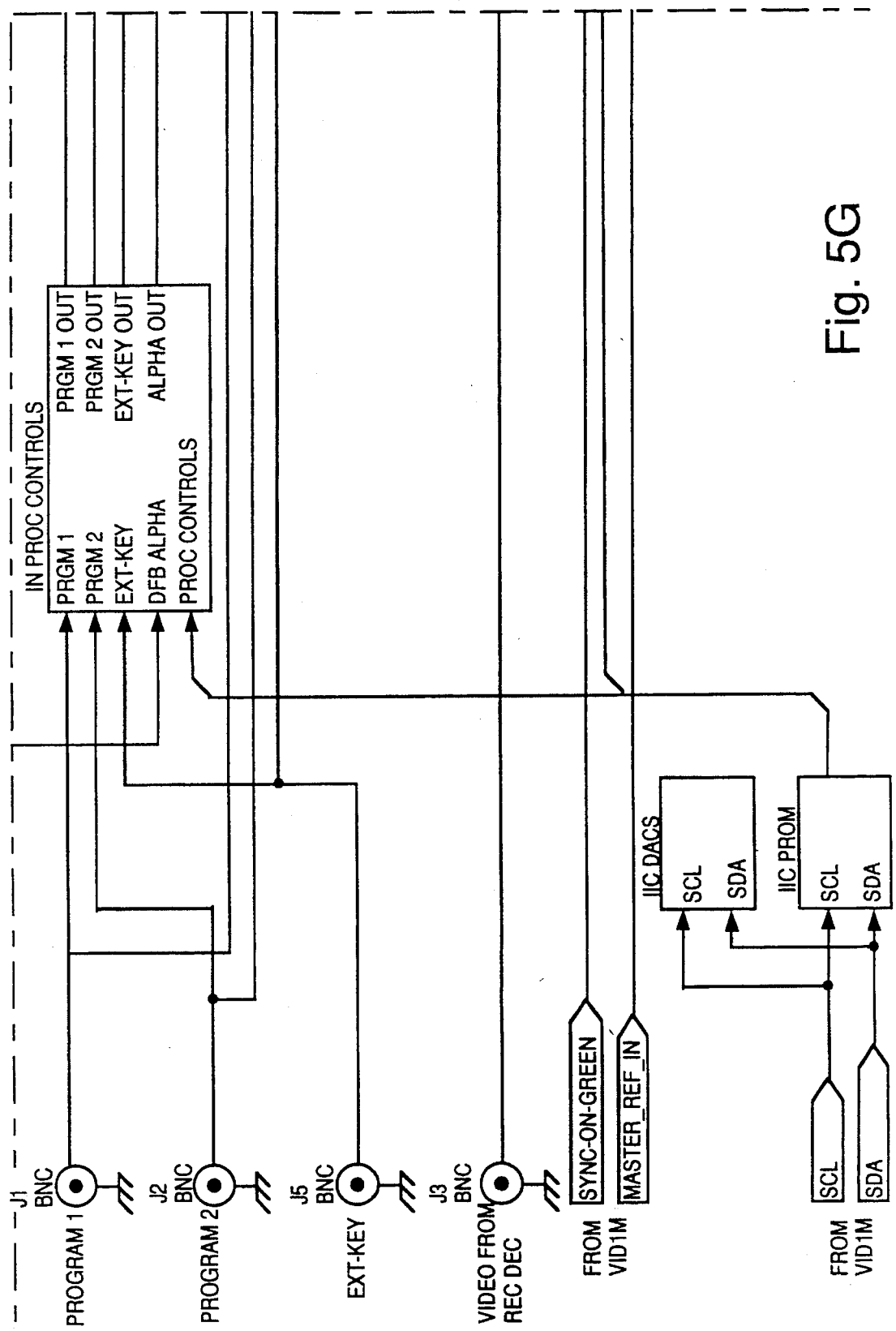
Figure 5H:
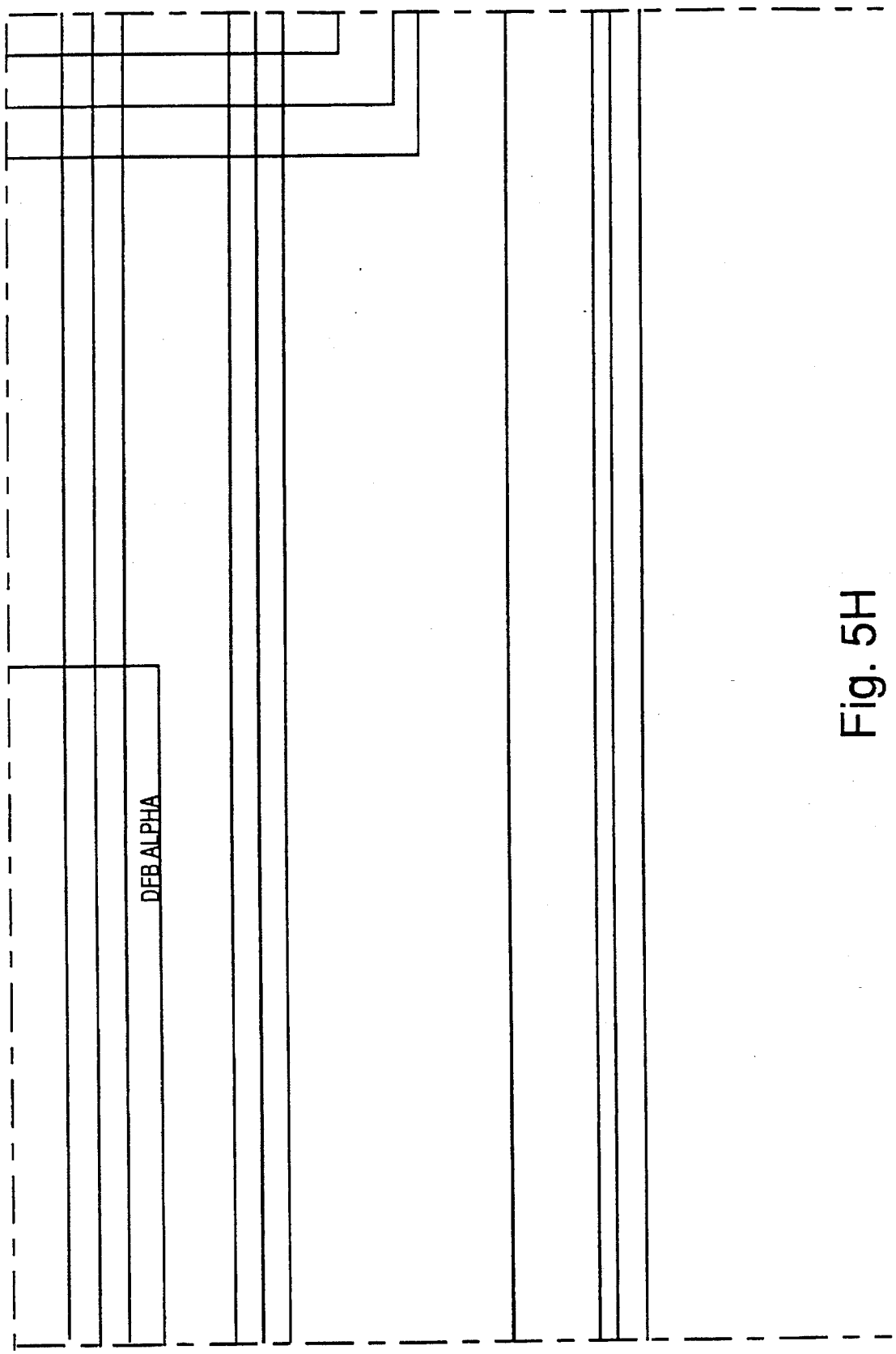
Figure 5I:
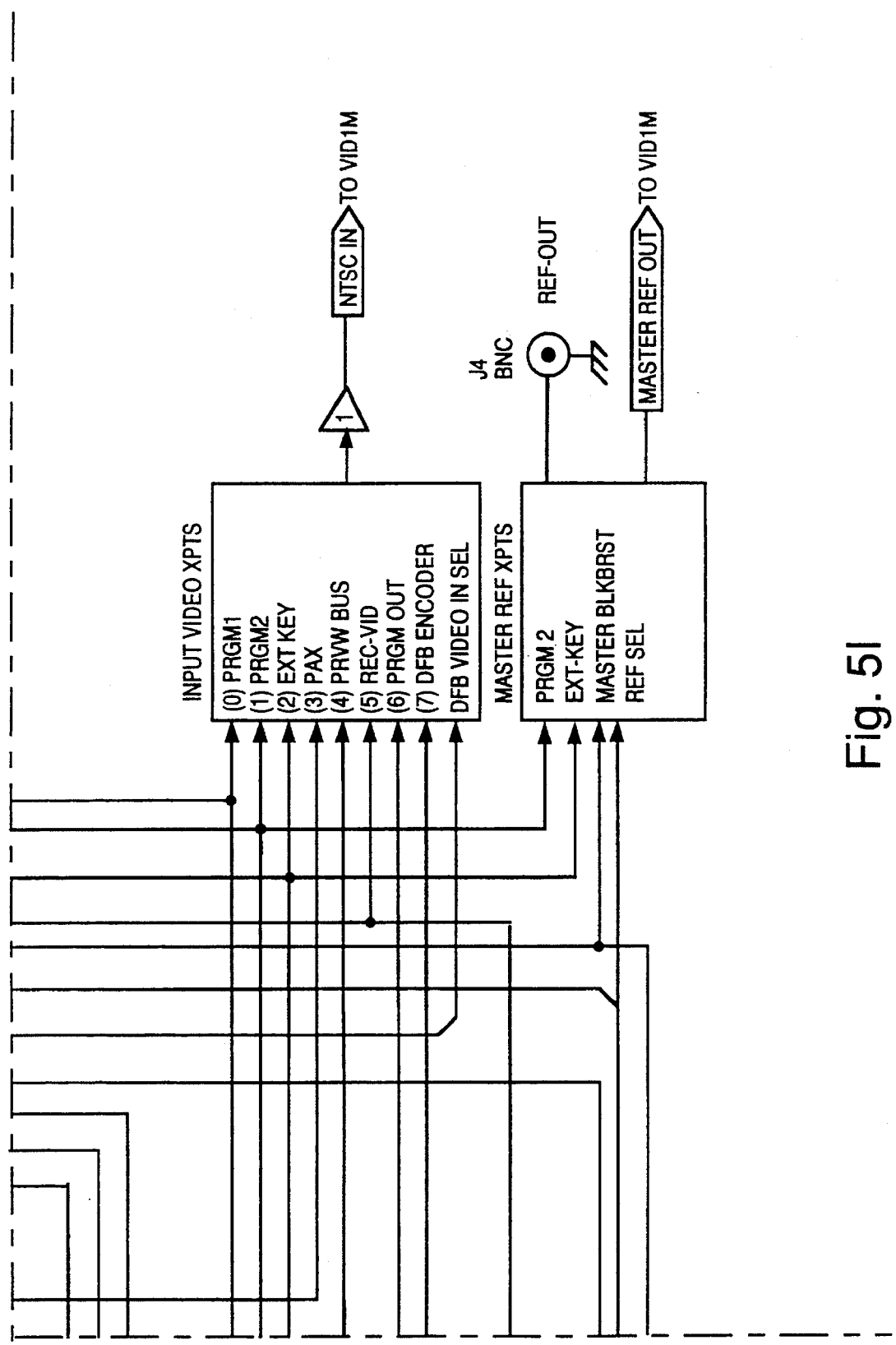
Figure 6A:
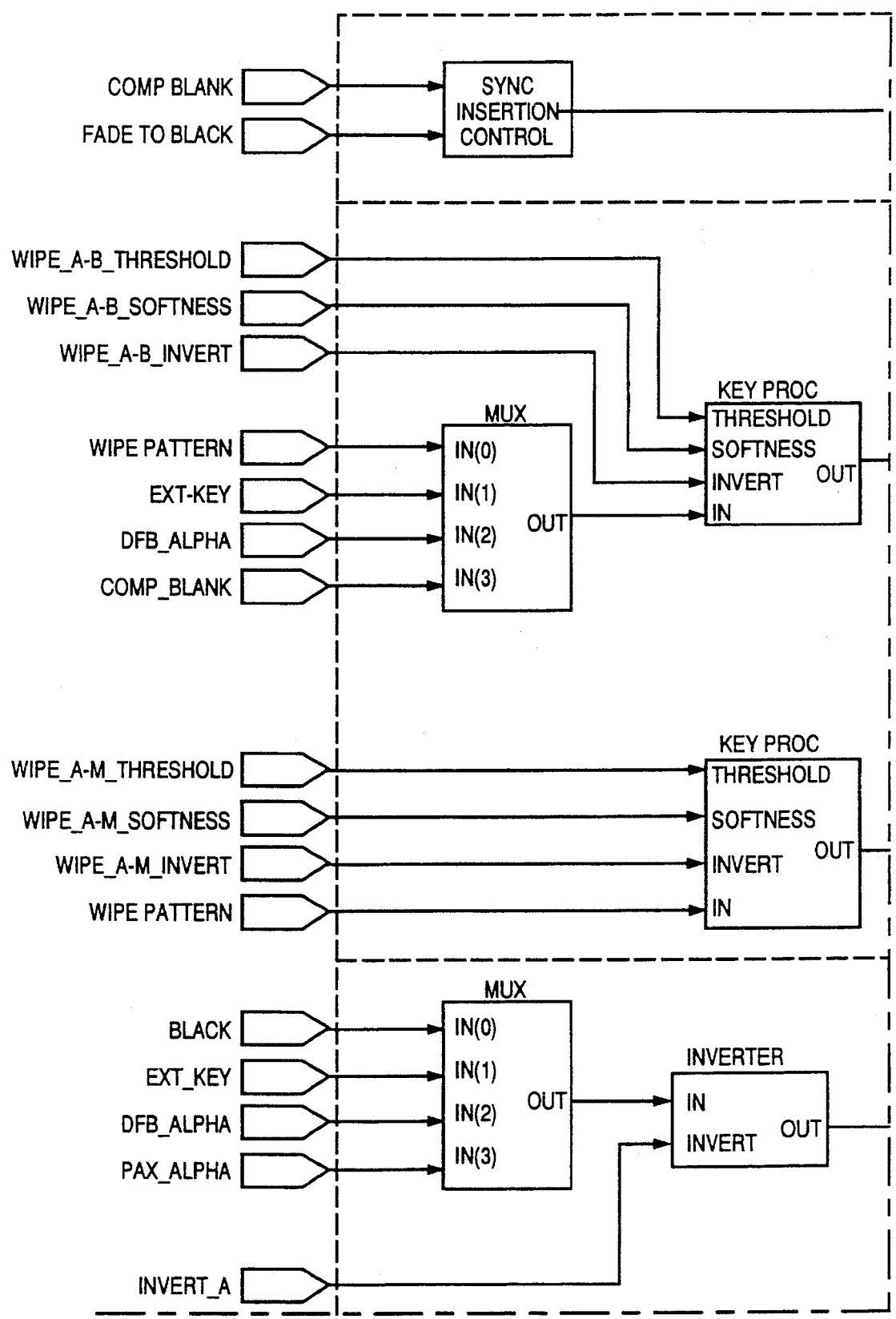
Figure 6B:
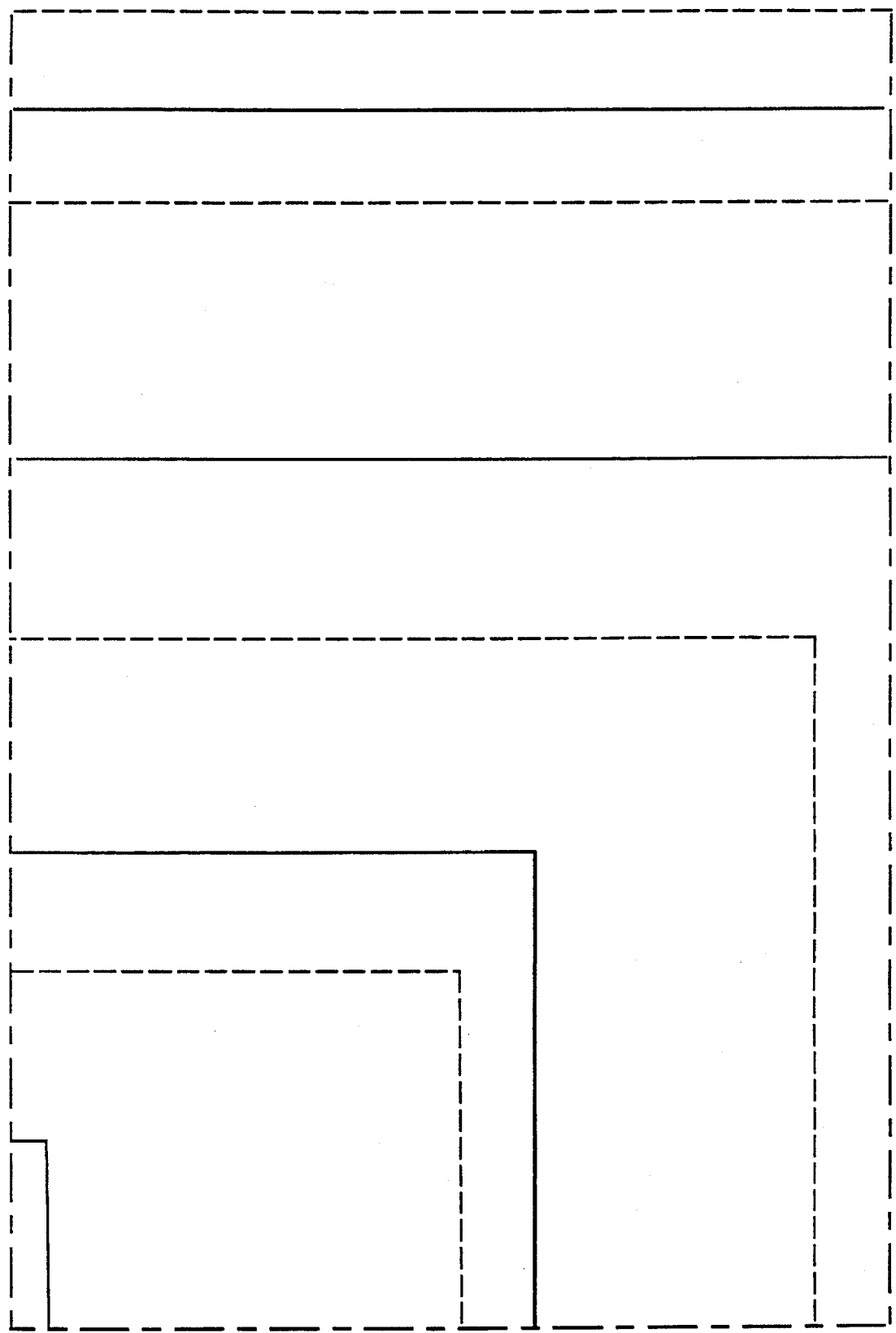
Figure 6C:
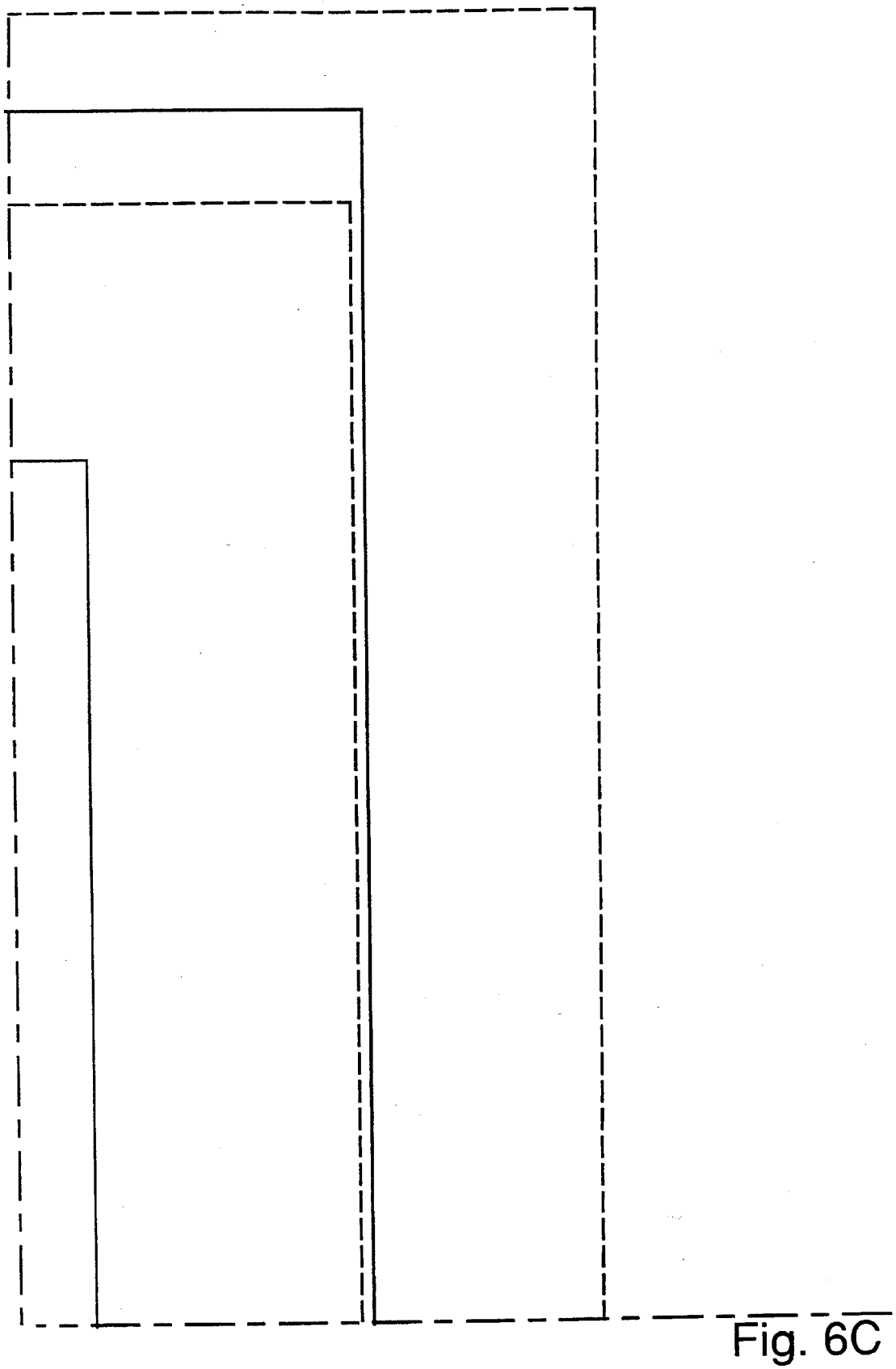
Figure 6D:
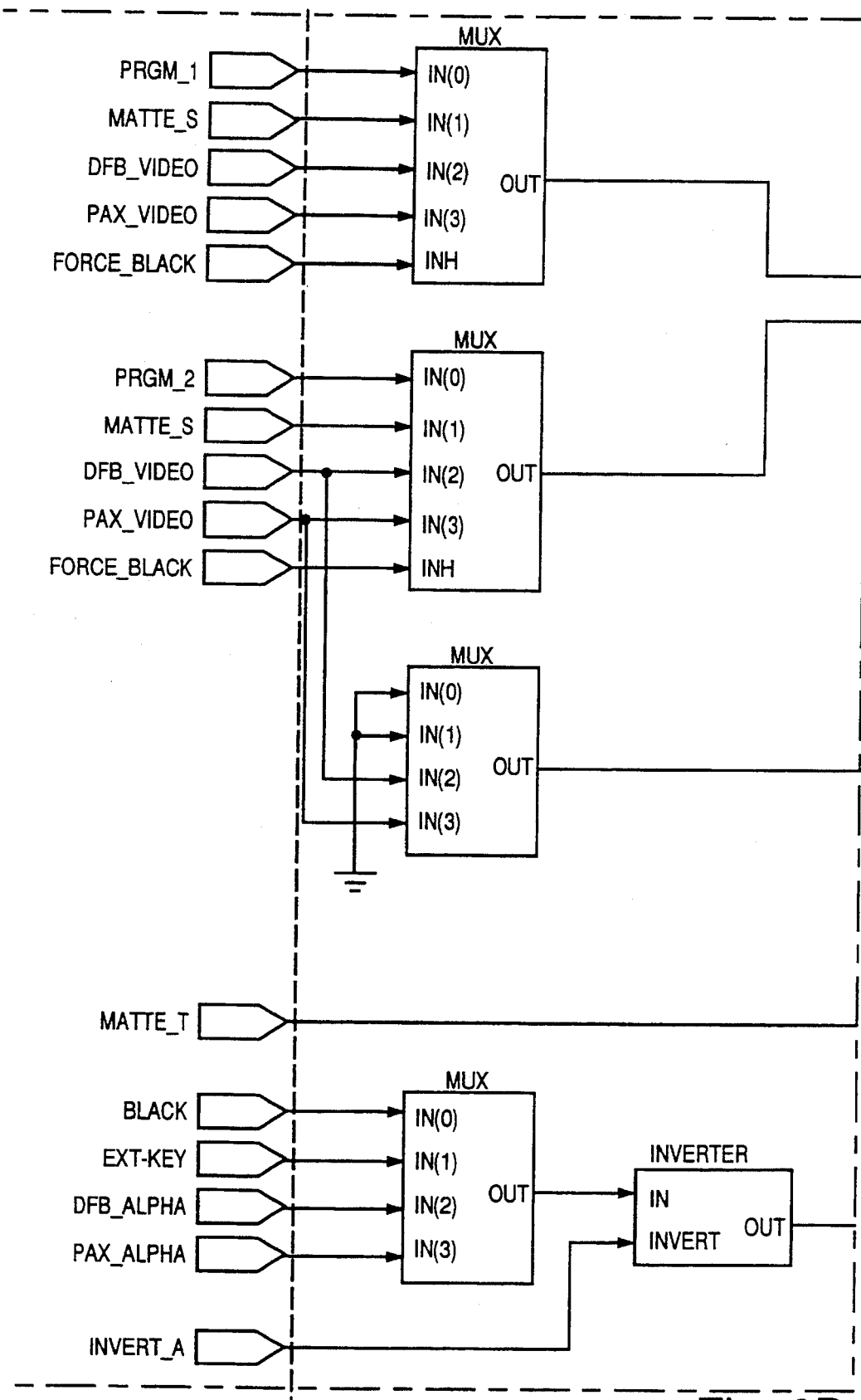
Figure 6E:
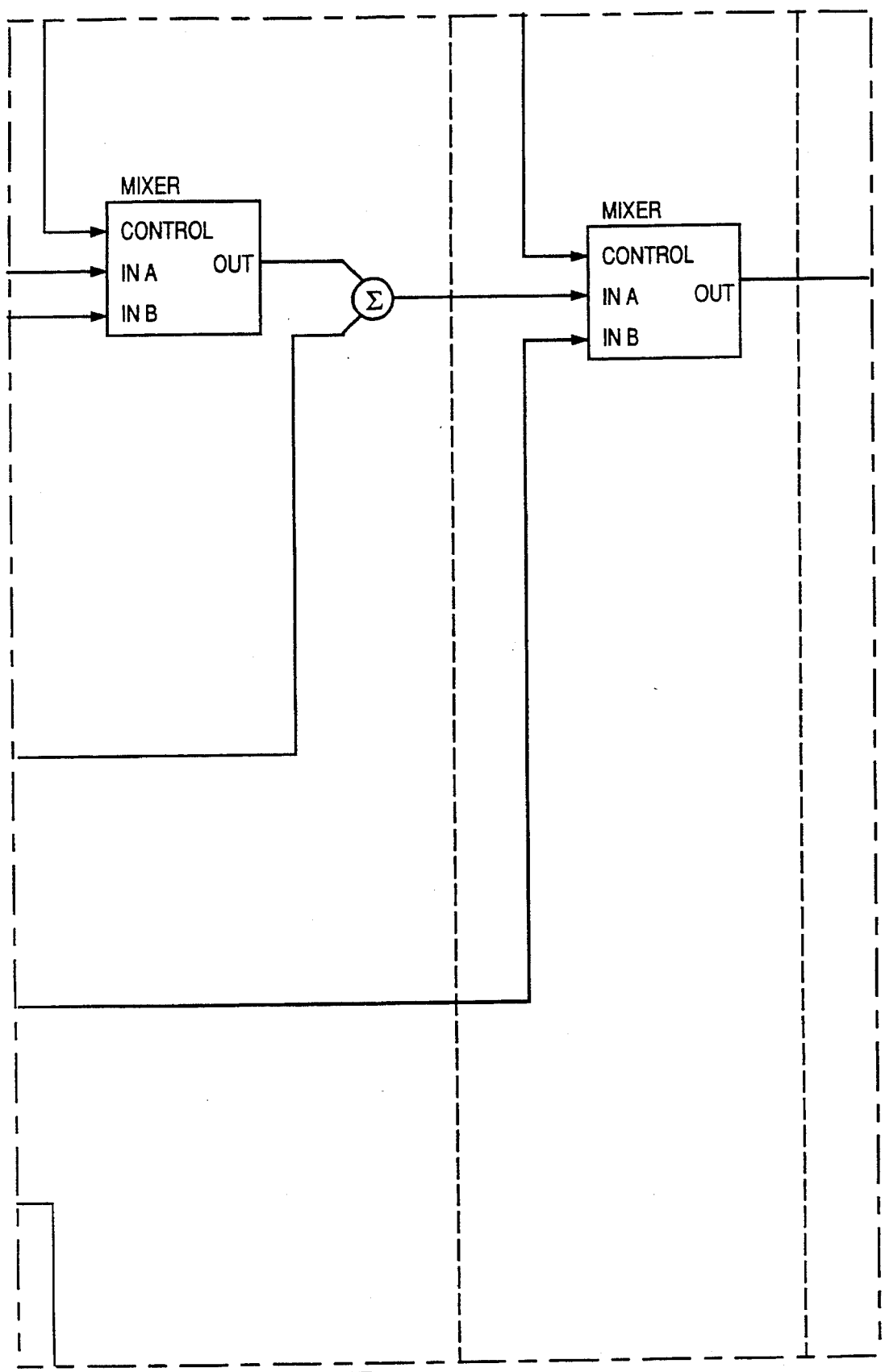
Figure 6F:
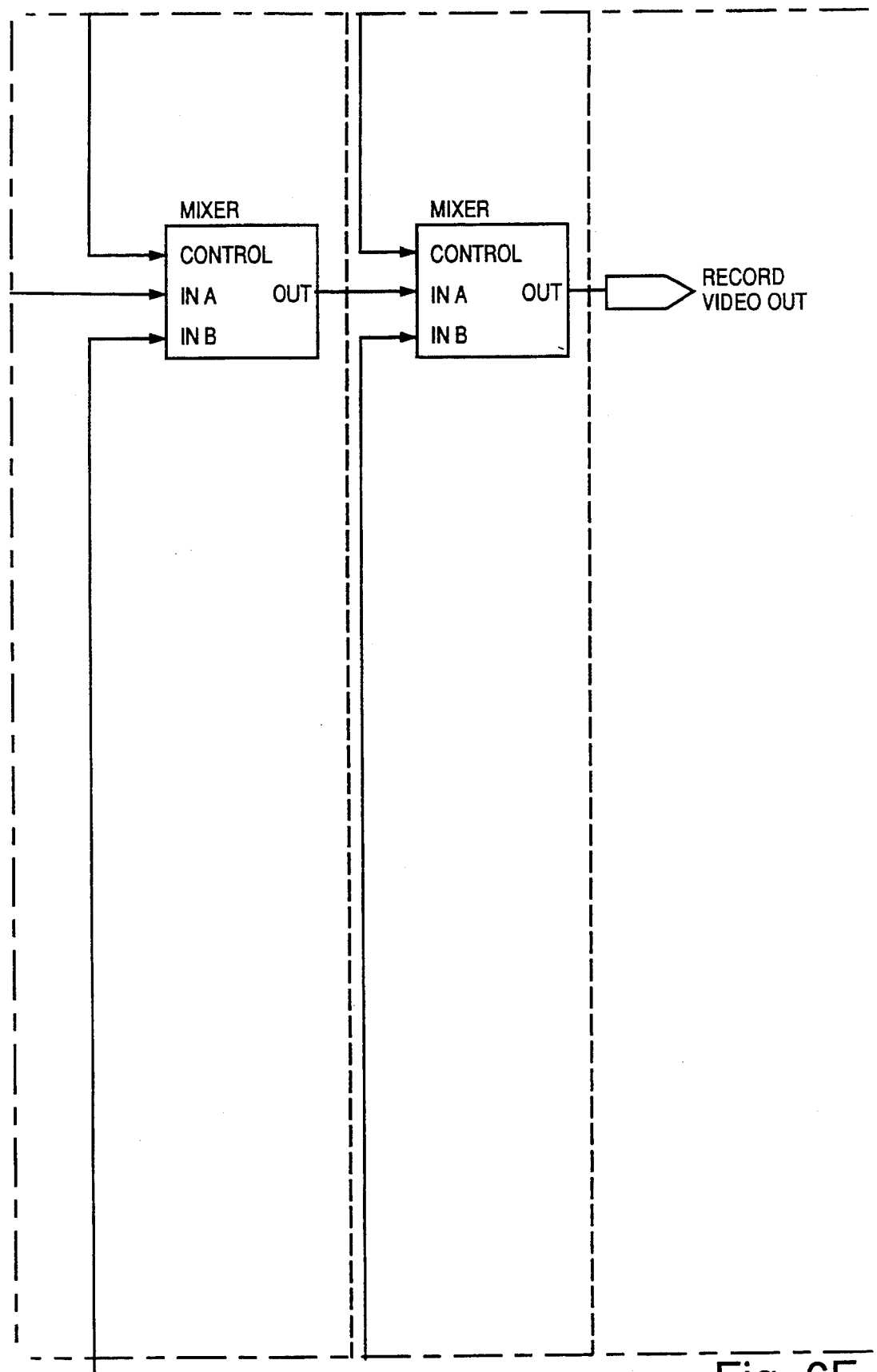
Figure 6G:
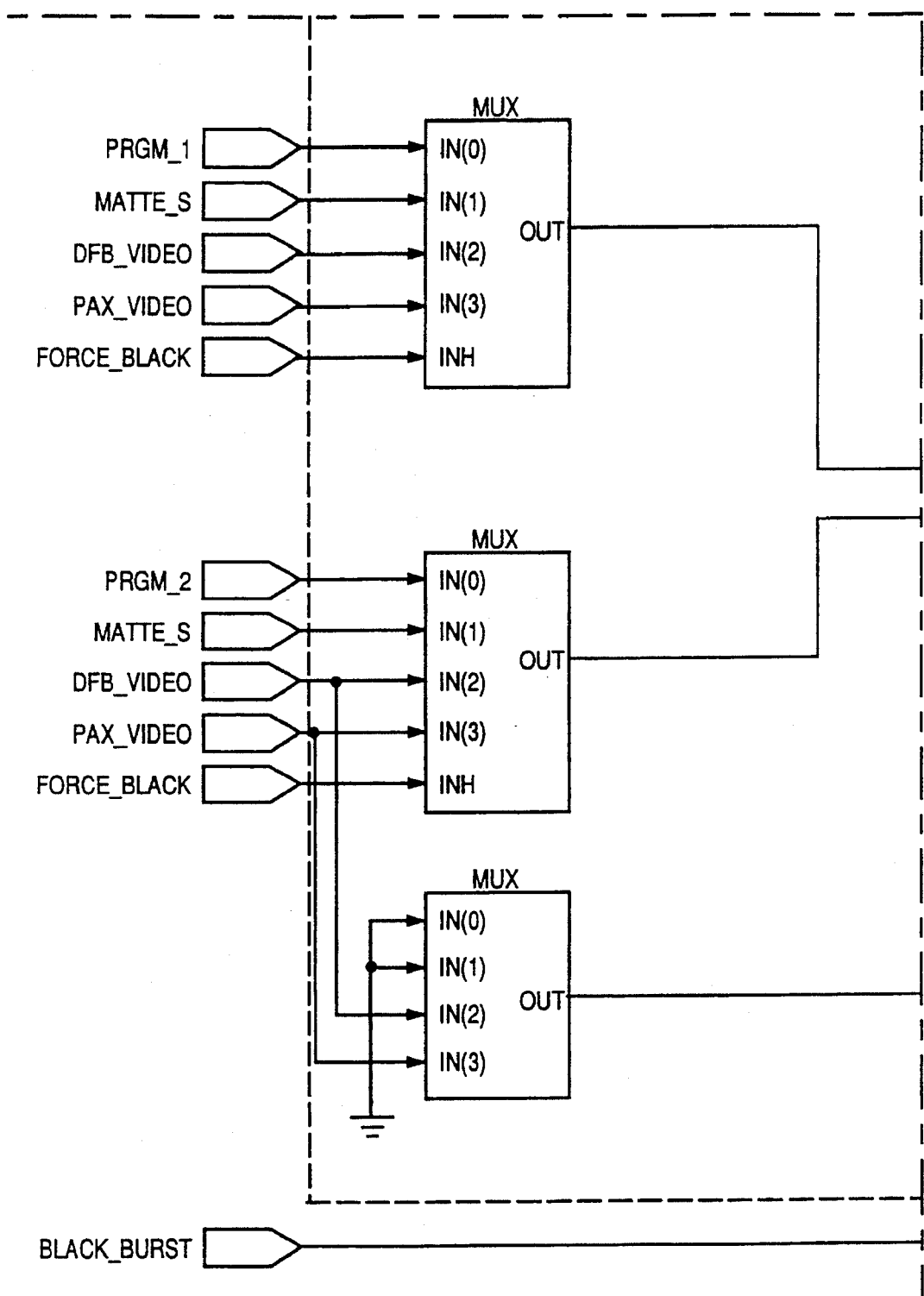
Figure 6H:
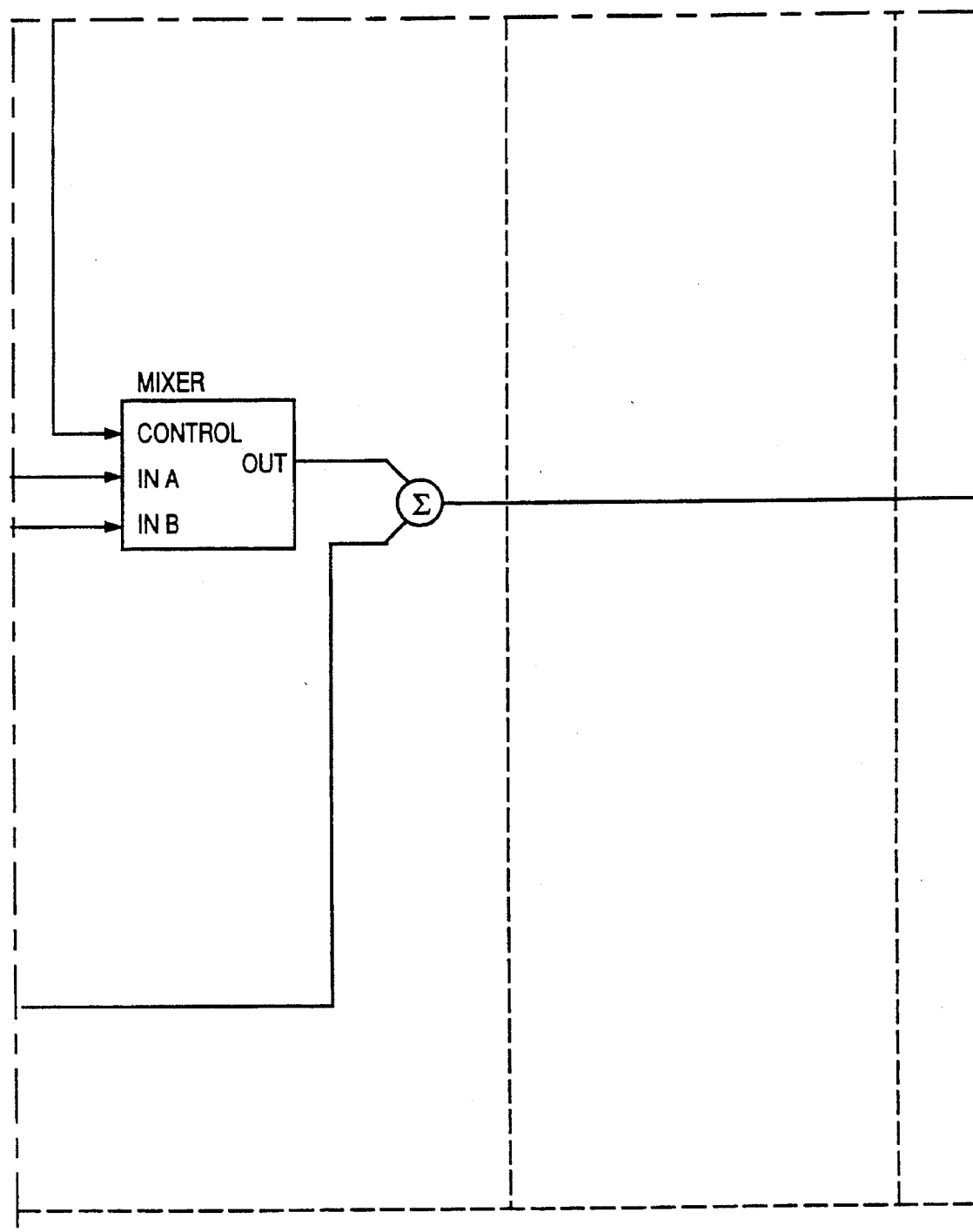
Figure 7A:
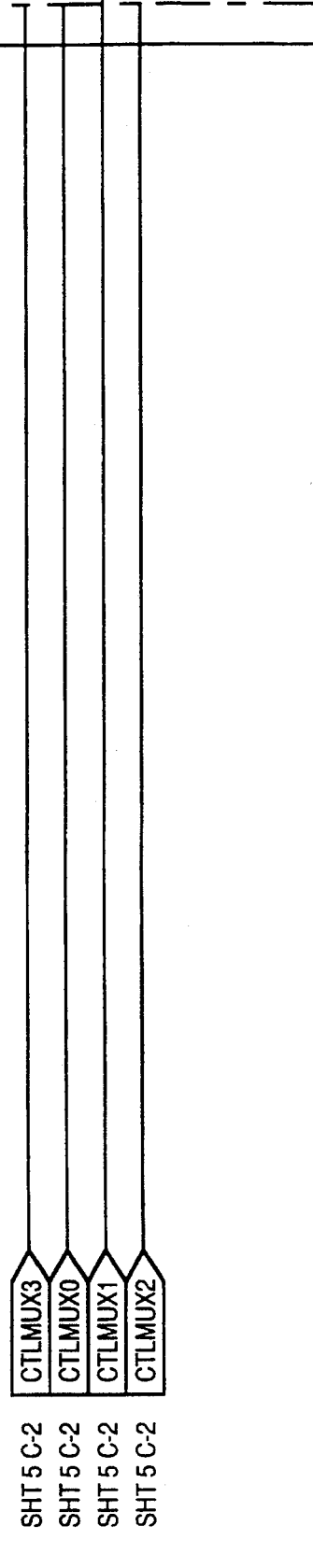
Figure 7B:
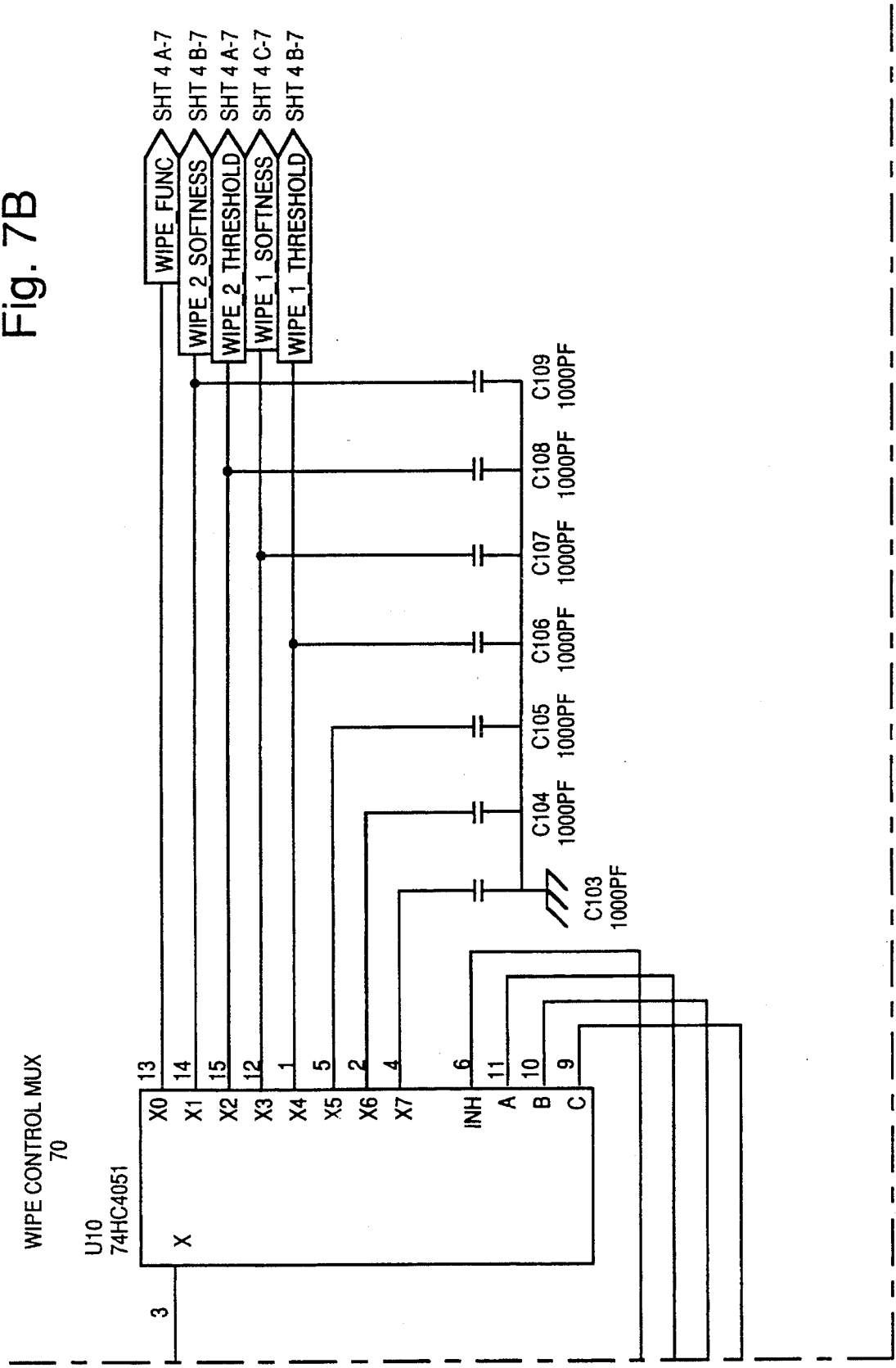
Figure 7C:
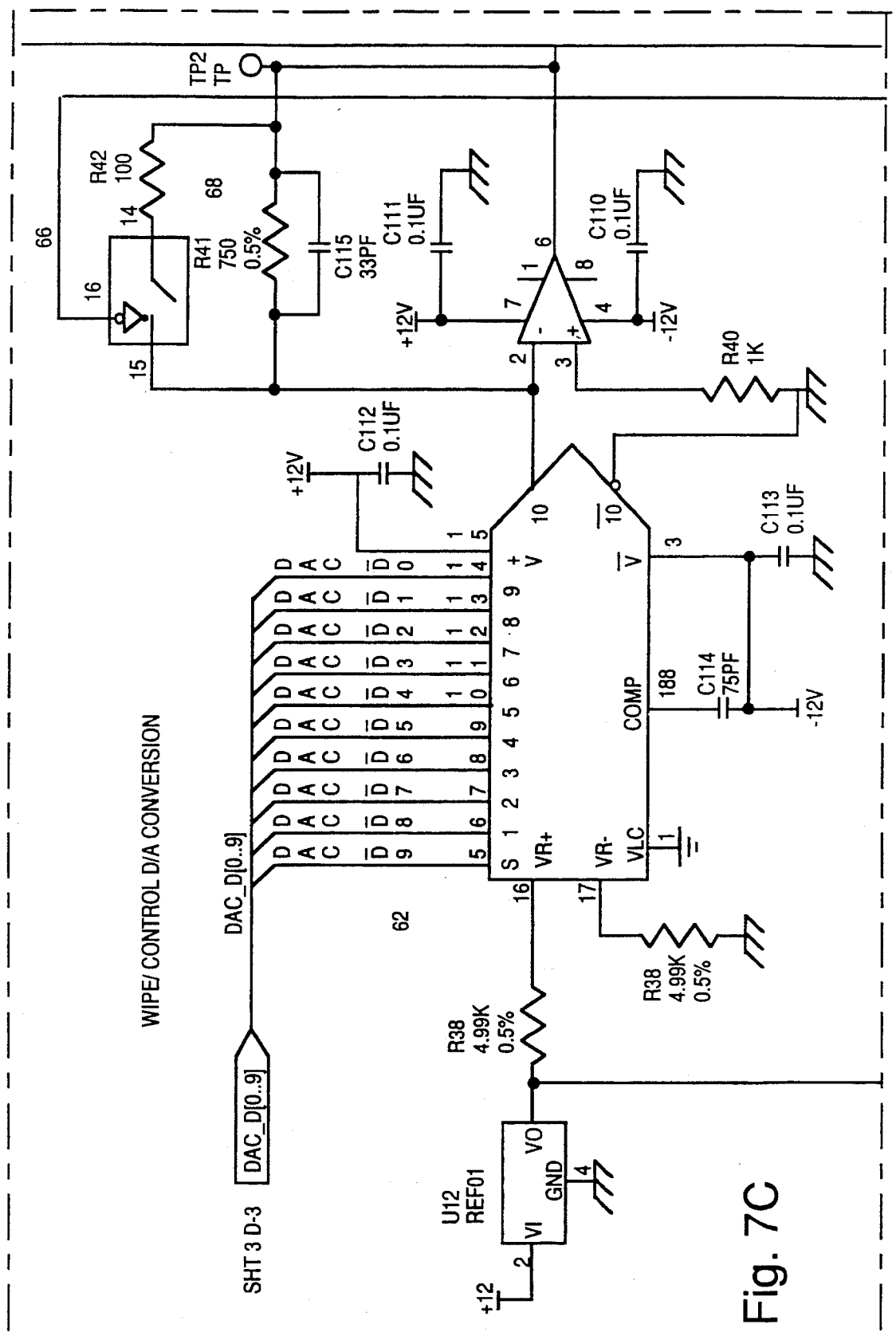
Figure 7D:
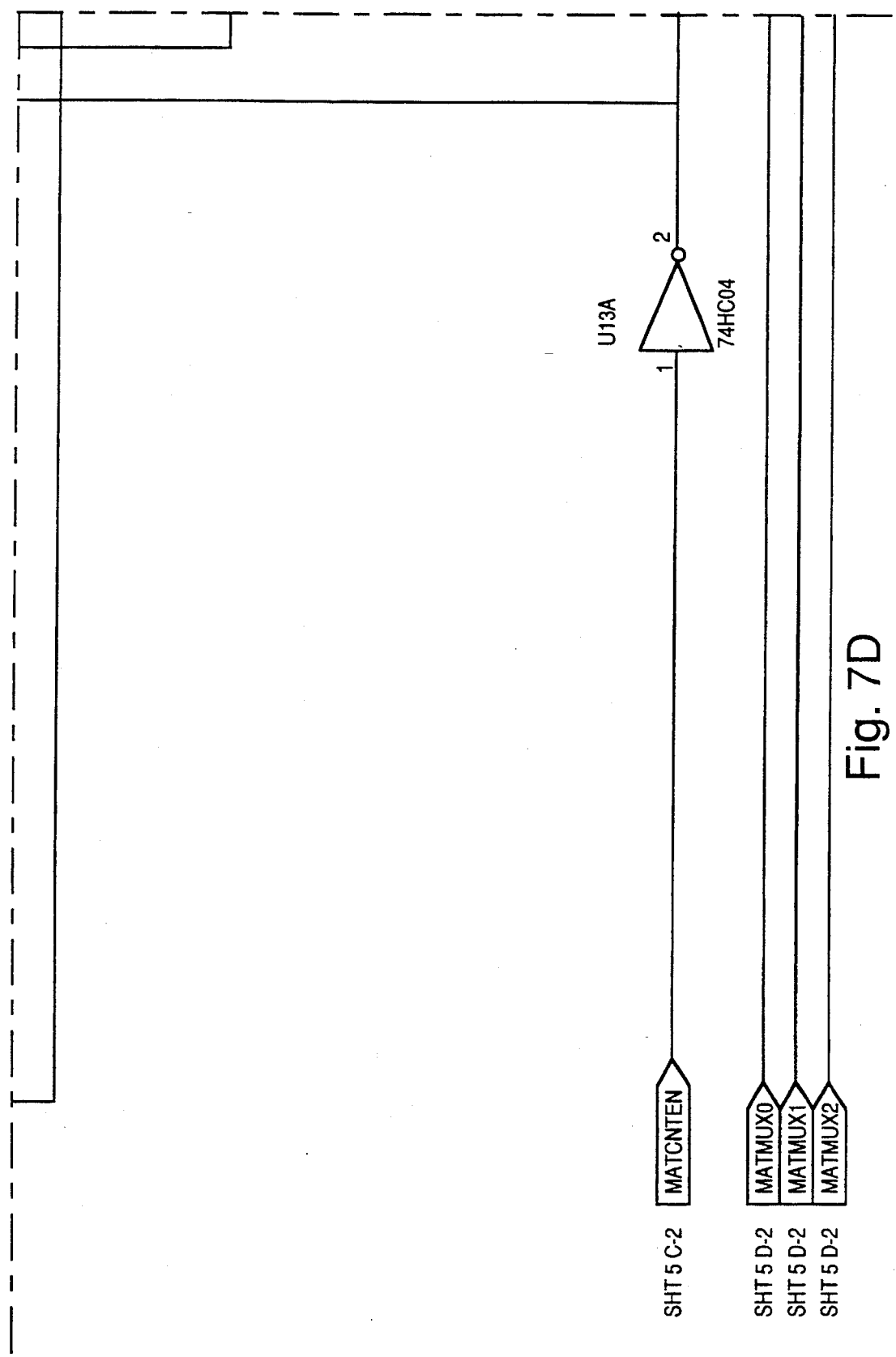
Figure 7E:
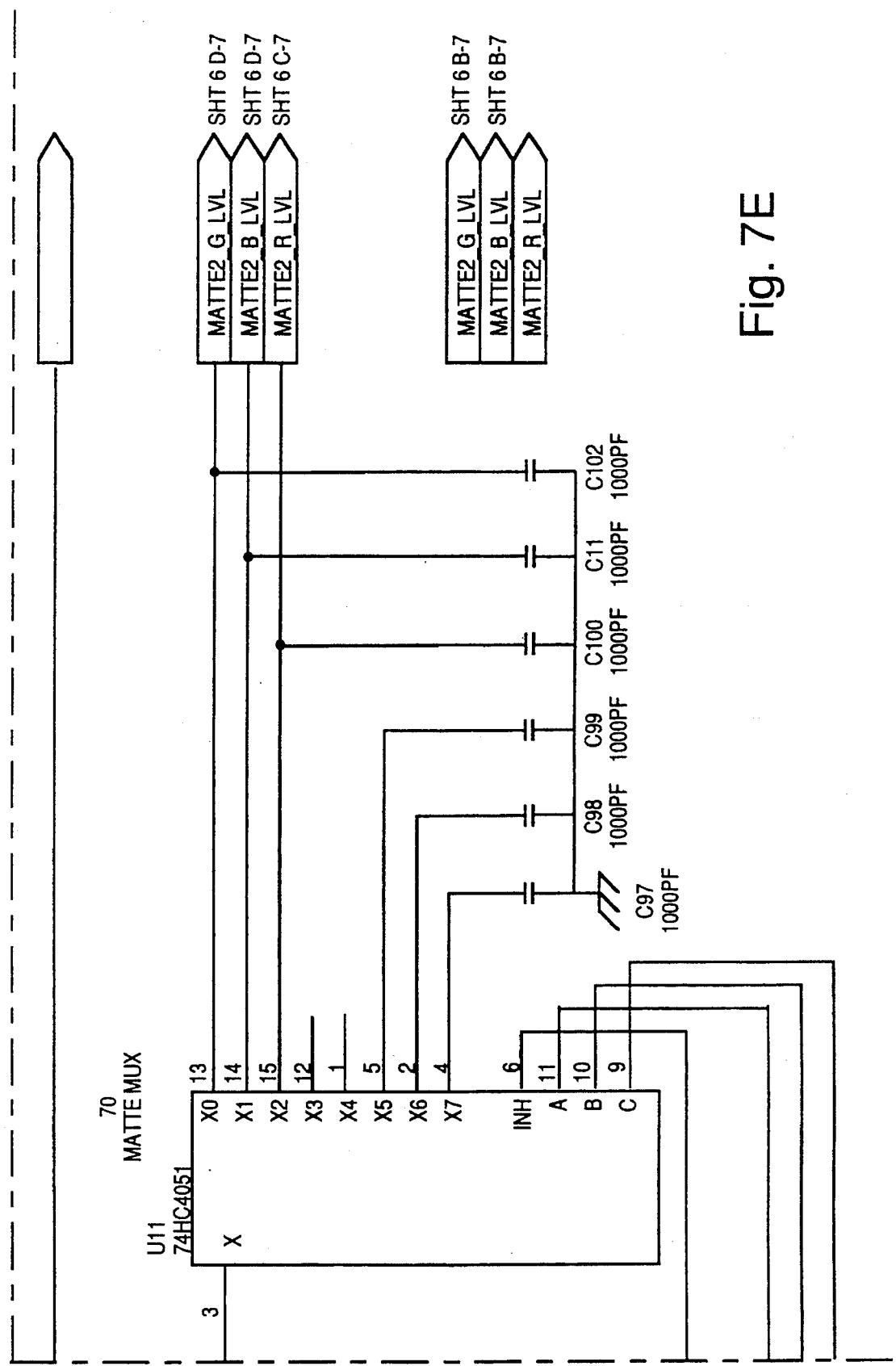

Matte patterns for two independent sets of mattes are stored in two 2-pixel by 484-line spaces in the DFB 10 memory (see FIGS. 4C, 4F). Matte values are stored as a 3-byte RGB (red green blue) value for each matte color (identically to RGC information in the active video area of the DFB). As with wipe patterns, the matte information for the next video display line is stored in the FIFO 54. The matte data for each line is read out of the FIFO 54 at the beginning of each display line and latched into a multiplexed video DAC 62 as RGB color information for the two mattes. This allows independent vertical gradients for each matte, and color animation is possible by writing into the "background" matte patterns, then setting the Matte Select bit in the Matte/DSK Control Register (see FIG. 4C) to swap the "foreground" and "background" mattes for the next display field. The Matte Select bit is only set during the Vertical Blanking interval (see FIG. 4D).

Control registers for Wipes, Mattes, and Downstream Keyer (DSK)/Switcher controls are stored in the DFB memory 10 in a 1-word by 12-line space which is located in the vertical blanking interval portion of the even field of the buffer (see FIG. 4B). Analog Control register values are stored as 10-bit words in the most significant 2-bytes of the DFB memory, while the Matte/DSK/Switcher Control Register (FIG. 4C) is 32-bits (non-analog). Data for these controls is read out of the FIFO during the vertical blanking interval of the even field (FIG. 4E), and latched into multiplexed DAC 62, providing analog control voltages to the Wipe Generator. The Matte/DSK Control register word (not an analog value) is stored in a register. These register values are held for the next display field, and are updated by writing to the "background" or non-displayed register set (in the opposite field of the one currently being displayed). The Control registers are identical for each field (even and odd lines repeated).

Figures 8A, 8B:
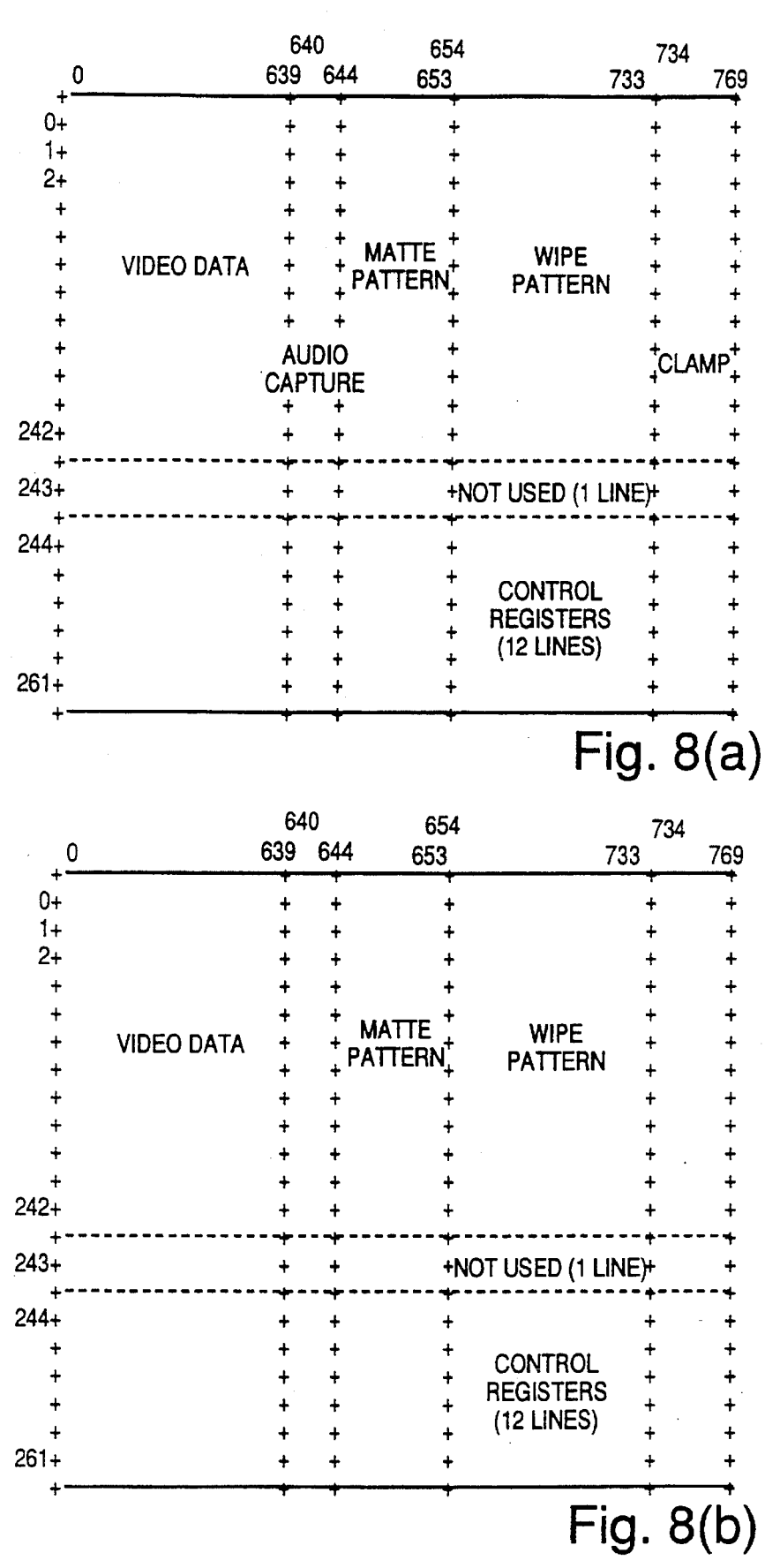

The map of FIG. 8(*a*) shows data locations in terms of pixel and line addresses (not memory addresses).

The map of FIG. 8(*b*) shows data locations in terms of pixel and line addresses (not memory addresses).

The 10-bit words of Wipe pattern data are packed in the 32-bit long-word space of the DFB 10 video memory as in Table 2.

TABLE 2

| 31  26 | 25  16 | 15  10 | 9  0 |
|---|---|---|---|
| not used | W9–W0 | not used | W9–W0 |
| W9–W10 | NV | W9–W0 | NV |

Wipe data patterns are written into the frame buffer 10 beginning at horizontal pixel address 654 and ending at horizontal pixel address 733, with two 10-bit words packed into each pixel address. Vertically, Wipe pattern data is stored in the DFB memory space associated with active video lines.

Since the Wipe data read out during each active video line is used to generate Wipe control voltages for the next display line, the Wipe controls for Display Line 0 will be stored in DFB memory in Line "-1".

The 8-bit bytes of Matte pattern data are packed in the least significant three bytes of the DFB video memory, identically to YUV video data as in Table 3.

TABLE 3

| 31  24 | 23  16 | 15  8 | 7  0 |
|---|---|---|---|
| not used | R | G | B |

Matte data patterns are written into the frame buffer at pixel addresses 644, 645 (Mattes 1A and 1B), and pixel addresses 644, 650 (Mattes 2A and 2B) as shown below, with three bytes of RGB data packed into each pixel address. Selection between display of matte A or B for Matte 1 and Matte 2 is controlled by the two Matte Select bits in the Matte/DSK/Switcher Control register as in Table 4.

TABLE 4

| 644 | 645 | 646  648 | 649 | 650  657 | 653 |
|---|---|---|---|---|---|
| MATTE 1A | MATTE 1B | not used | MATTE 2A | MATTE 2B | not used |

Vertically, Matte data is stored in DFB memory space associated with active video display lines. Since the Matte data read out during each active video line is used to generate the Matte color for the next display line, the Matte color values for Display Line 0 will be stored in DFB memory in Line "-1". There is a two pixel buffer zone between the active video area and the beginning of the Matte data area in the DFB memory, of addresses which overrun the normal active video area.

The ten bit words of Control data are packed in the 32-bit long-word space of the DFB video memory similar to Wipe data as in Table 5.

TABLE 5

| 31  26 | 25  16 | 15  10 | 9  0 |
|---|---|---|---|
| not used | V9–W0 | not used | W9–W0 |
| W9–W0 | N.D. | 15 | 0 |

With the exception of the Matte/DSK Control register, all of the ten bit values set in these registers are latched into a ten bit multiplexed DAC, which provides analog voltages to control the related functions.

Control Register words are written into the frame buffer at horizontal pixel address 655, with two words packed into each pixel address (least significant word is for Video Control registers, most significant for Audio Mixer Control registers). Each line address contains two Control words as in Table 6.

TABLE 6 field line adr.

| | |
|---|---|
| 244 | WIPE 2 SOFTNESS |
| 245 | WIPE 2 THRESHOLD |
| 246 | WIPE 1 SOFTNESS |
| 247 | WIPE 1 THRESHOLD |
| 248 | V EXPANSION |
| 249 | V EXPANSION |
| 250 | U EXPANSION |
| 251 | U EXPANSION |
| 252 | Y EXPANSION |
| 253 | Y EXPANSION |
| 254 | MATTE/DSK/SW  CONTROLS |

Also provided in accordance with the invention is computer software conventionally installed in the Macintosh computer 50 described above. An example of a computer program in accordance with the invention is shown in FIG. 9. The computer program (written in the C language) is a representative program for reading a wipe pattern from disk and writing it to the digital frame buffer (DFB) 10. As shown, the write is to DFB locations 654 to 733 (see "WRITE" instructions).

A second computer program (also in the C language) in accordance with the invention is shown in FIGS. 10(*a*) to 10(*c*). This second program is an example which creates a circular wipe pattern and writes it to disk. The equation for a circular wipe is shown at the last lines of FIG. 10(*b*). FIG. 10(*c*) shows the relevant definitions.

This patent disclosure includes copyrightable material. The copyright owner gives permission for facsimile reproduction of material in Patent Office files, but reserves all other copyright rights whatsoever.

The above description of the invention is descriptive and not limiting. Further embodiments of the invention will be apparent in the light of this disclosure and the appended claims.

We claim:

1. A method of generating a video wipe effect comprising the steps of:

storing a wipe pattern;

providing a high threshold level and a low threshold level;

comparing the high threshold level to the stored wipe pattern;

comparing the low threshold level to the stored wipe pattern;

providing a first control signal in response to the comparisons of the wipe pattern and the high and low threshold levels;

determining a resulting video signal from a number representing a ratio of a first video signal to a second video signal, as determined by the stored wipe pattern, and providing a second control signal in response thereto; and switching between at least the first and second video signal in response to the first and second control signals.

2. The method of claim 1, further comprising the step of providing the wipe pattern as a portion of one video line.

3. The method of claim 1, further comprising the step of converting the wipe pattern from a digital to analog signal and then filtering the analog signal.

4. The method of claim 1, further comprising the step of providing a gain value for controlling the steps of comparing.

5. The method of claim 1, wherein each of the steps of comparing includes comparing stored horizontal, vertical, and amplitude values of the wipe pattern to corresponding values of the threshold level.

6. The method of claim 1, further comprising the steps of:

providing a memory, wherein the wipe pattern is stored in the memory; and scanning the memory storing the wipe pattern in synchronization with a video reference signal.

7. The method of claim 1, wherein the step of storing comprises horizontally compressing the stored wipe pattern.

8. The method of claim 1, wherein the stored wipe pattern is interleaved with additional data.

9. The method of claim 1, further comprising the step of controlling a time at which the switching occurs.

10. The method of claim 1, further comprising the step of altering the high and low threshold levels in response to user commands.

11. The method of claim 1, further comprising the step of generating the high and low threshold levels by values defined by a user.

* * * * *